United States Patent
Cheng

(10) Patent No.: US 6,700,582 B2
(45) Date of Patent: Mar. 2, 2004

(54) METHOD AND SYSTEM FOR BUFFER MANAGEMENT

(75) Inventor: Nai-sheng Cheng, Hsin-chu (TW)

(73) Assignee: Via Technologies, Inc., Taipei (TW)

( * ) Notice: Subject to any disclaimer, the term of this patent is extended or adjusted under 35 U.S.C. 154(b) by 334 days.

(21) Appl. No.: 09/825,926

(22) Filed: Apr. 5, 2001

(65) Prior Publication Data

US 2001/0028353 A1 Oct. 11, 2001

(30) Foreign Application Priority Data

Apr. 7, 2000 (TW) ...................................... 89106479 A

(51) Int. Cl.⁷ ................................................ G09G 5/39
(52) U.S. Cl. ........................ 345/531; 345/520; 345/522; 345/558; 345/564
(58) Field of Search ................................ 345/531, 536, 345/539, 545, 557, 558, 520, 522, 564; 711/169

(56) References Cited

U.S. PATENT DOCUMENTS 6,405,258 B1 * 6/2002 Erimli et al. ................ 709/235

FOREIGN PATENT DOCUMENTS

JP          402161514 A   *  6/1990   ............. G06F/3/06

* cited by examiner

*Primary Examiner*—Matthew C. Bella
*Assistant Examiner*—Mackly Monestime
(74) *Attorney, Agent, or Firm*—Rabin & Berdo, P.C.

(57) ABSTRACT

A method and a system for buffer management is provided. The system includes a central processing unit, a multimedia chip, a buffer, a beginning register, an ending register, and a pause register. The beginning register is employed to store a beginning address of the buffer, and the ending register is used to storing an ending address of the buffer or buffer length. Content of the pause register is a data address associated with a command data. In addition, the pause register includes a pause code. When the pause code is equal to a first value, after the multimedia chip reads command data associated with the content of the pause register, reading is stopped, and the command data next to the command data are to be read in the next reading. When the pause code is equal to a second value, after the multimedia chip reads the command data associated with the content of the pause register, the multimedia chip continues to reads command data associated with the beginning register.

28 Claims, 23 Drawing Sheets

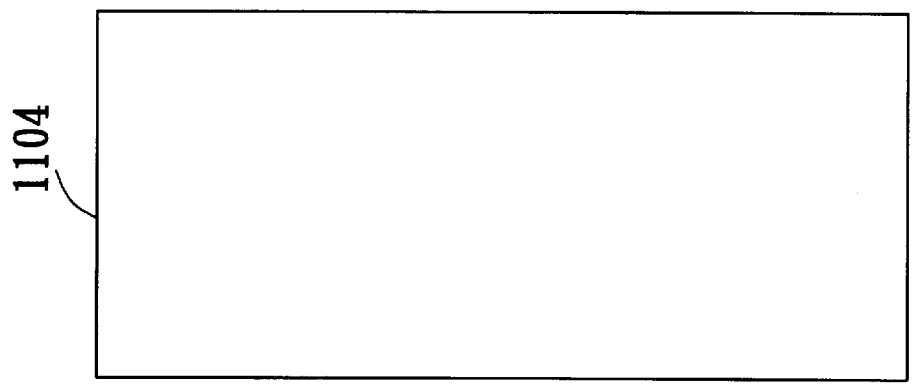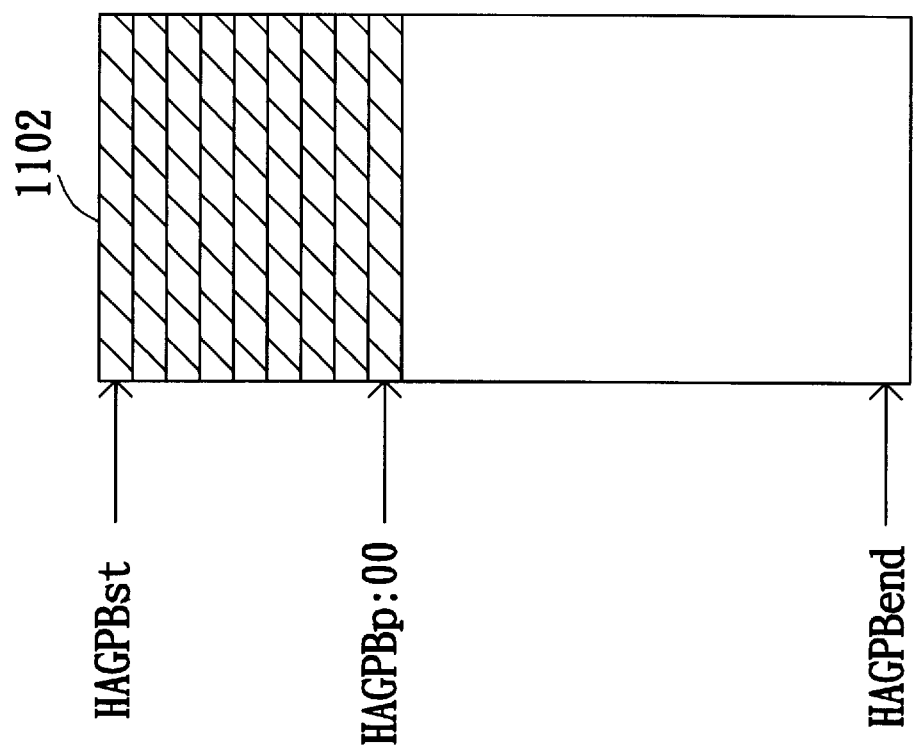
FIG. 13A

METHOD AND SYSTEM FOR BUFFER MANAGEMENT

This application incorporates by reference Taiwanese application Ser. No. 89106479, filed on Apr. 7, 2000.

BACKGROUND OF THE INVENTION

1. Field of the Invention

The invention relates in general to a method and system for buffer management, and more particularly to a management method and system for ring buffer and multiple buffer for accelerated graphic port (AGP) interface.

2. Description of the Related Art

Referring to FIG. 1, it illustrates the partial structure of a conventional computer system in block diagram form. A central process unit (CPU) 102 reads data from or writes data into a memory 106 through a chipset 104, such as a north bridge, and the chipset 104 is coupled to a multimedia chip 110 through a bus 108 such as an AGP bus or a peripheral component interface (PCI) bus, wherein the multimedia chipset 110 is employed to process audio, video, and graphic data.

In the computer system, the CPU 102 communicates with the multimedia chip 110 via the chip set 104. Since the multimedia chip 110 have to handle and execute a large amount of computation, when the CPU 102 sends a command signal to the multimedia chip 110, it takes a certain time for the CPU 110 to wait for a command signal being executed by the multimedia chip 110. Thus, it will degrade the performance of the CPU 102. In this way, an AGP buffer is employed to reduce this degradation.

AGP buffer 112 is a storage area in the memory 106, which is used to store AGP command data associated with multimedia commands to be sent by the CPU 102 to the multimedia chip 110. Firstly, the CPU 102 writes AGP command data into the AGP buffer 112. Next, the multimedia chip 110 reads the AGP command data from the AGP buffer 112 and executes the AGP command data. In addition, the AGP buffer 112 can be modified by the chipset. Further, at a certain time, the AGP buffer 112 can be only read or written. During writing, the CPU 102 should avoid from writing data into a portion in the AGP buffer 112 that has not been read; and during reading, the multimedia chip 110 should avoid reading from a portion in the AGP buffer 112 into which data has not been written.

Referring to FIGS. 2A–2D, they illustrate a partial structure of another conventional computer system using integrated chipset 202, 206, 208, and 210 respectively.

In FIG. 2A, the CPU 102 accesses the memory 106 through the integrated chipset 202. The integrated chipset 202 includes the chipset 104 and multimedia chip 110, where between the chipset 104 and the multimedia chip 110, there is an internal interface 204, such as an AGP like interface or a peripheral component interconnect (PCI) like interface.

In FIG. 2B, the integrated chipset 206 includes the CPU 102 and chipset 104. In addition, the CPU 102 accesses the memory 106 by using the chipset 104 via the bus 108.

In FIG. 2C, the integrated chipset 208 includes the CPU 102, chipset 104, and multimedia chip 110. Likewise, the internal interface between the chipset 104 and the multimedia chip can be an AGP like interface or a PCI like interface, for instance.

In FIG. 2D, the integrated chipset 210 includes the CPU 120 and the multimedia chip 110.

Referring now to FIG. 3, it illustrates the relation among software and hardware components in the conventional computer system. Application program (AP) 302 is a program directly communicating with a user. Operating system (OS) 304 includes application program interface (API) 306 and driver interface 308. In addition, a device driver 312 controls the multimedia chip 110. The API 306, defined by the OS 304, is the interface between the OS 304 and AP 302 for support function calls by the AP 304. The driver interface 308, defined by the OS 304, is the interface between the OS 304 and the device driver 312. Besides, the device driver 308 programs the multimedia chip 110 so as to manage the AGP buffer 112. To be specific, programming the multimedia chip 110 is to read and write to registers (not shown) associated with the multimedia chip 110, where the registers can be designed as ones inside the multimedia chip 110 or chipset 104.

Referring to FIG. 4, it illustrates a first conventional approach with an AGP buffer. Beginning register 402 is to store the beginning address of the AGP buffer 112 while ending register 406 is to store the ending address of the AGP buffer 112. Alternatively, the length of the AGP buffer 112 can be stored in the ending register 406, leading to the same effect. For this example, the ending register 406 is to store the ending address of the AGP buffer 112.

The device driver 312 controls the multimedia commands to be sent by the CPU 102 to the multimedia chip 110. First, the AGP command data associated with the multimedia commands are written into the AGP buffer 112. Then, the multimedia chip 10 reads and executes the AGP command data in the AGP buffer 112.

Referring to FIG. 5, it illustrates a method for managing the AGP buffer shown in FIG. 4. First, the method begins in step 502, where the device driver 312 writes the AGP command data into the AGP buffer 112. Then, the method proceeds to step 504. In step 504, the device driver 312 sets the beginning register 402 and the ending register 406. That is, the beginning and ending addresses of the AGP buffer 112 are written into the beginning register 402 and the ending register 406, respectively. Next, step 506 is performed, where the device driver 312 triggers the multimedia chip 110 to start reading the AGP command data in the AGP buffer 112. Then, the method proceeds to step 508. In step 508, it is determined whether the device driver 312 has AGP command data left to be written into the AGP buffer 112. If yes, step 510 is performed; otherwise, the method ends.

In step 510, a determination is made whether the multimedia chip 110 is idle. That is to determine whether the multimedia chip 110 stops accessing the AGP buffer 112 and stays idle. If yes, step 502 is repeated, where the device driver 312 writes AGP command data into the AGP buffer 112. If not, step 510 is repeated. In this way, the device driver 312 can continue to write AGP command data into the AGP buffer 112 only if the multimedia chip 110 is idle.

In the method above, step 502 and step 504 are interchangeable. In addition, in each iteration from steps 502 to 510, the AGP buffer 112 can correspond to different area in the memory 106.

However, the method has a disadvantage of inefficiency. Since the method does not use read pointer to indicate the address that the multimedia chip 110 uses during performing reading on the AGP buffer 112, the device driver 312 must be waiting to perform reading until the multimedia chip 100 is idle, resulting in a waste of time. Besides, this makes the CPU 102 cannot execute other application and the multimedia chip 110 resumes operating after a waiting time.

Moreover, in order to prevent the multimedia chip 110 from reading the portion of the AGP buffer 112 having not been written into, the device driver 312 triggers the multimedia chip 110 only after completing read operations on the AGP buffer 112. In this way, the multimedia chip 110 can perform reading on the AGP buffer 112.

Referring to FIG. 6, it illustrates another conventional AGP buffer. A first beginning register 602 and a first ending register 604 are used for storing the beginning and ending addresses of a first AGP buffer 606 respectively. A second beginning register 608 and a second ending register 610 are used for storing the beginning and ending addresses of a second AGP buffer 612 respectively. In addition, the AGP buffer 112 includes the first AGP buffer 606 and second AGP buffer 612.

FIG. 7 shows a method for managing AGP buffers in FIG. 6 in a flow chart. The method begins and proceeds to step 702. In step 702, the device driver 312 writes AGP command data into the first buffer 606, and the method then proceeds to step 704. In step 704, the device driver 312 is to determine whether the multimedia chip 110 is idle, that is, determining whether the multimedia chip reads AGP command data from the AGP buffer 112. If yes, step 706 is performed; otherwise, the method repeats from step 704.

In step 706, the device driver 312 writes the beginning and ending addresses of the first AGP buffer 606 into the first beginning register 602 and a first ending register 604 respectively. Then, step 708 is performed. In step 708, the device driver 312 triggers the multimedia chip 110 to read AGP command data from the first AGP buffer 606, and the method then proceeds to step 710. In step 710, the device driver 312 writes the AGP command data into the second AGP buffer 612. Then, in step 712, the device driver 312 is to determine whether the multimedia chip 110 is idle, that is, to determine whether the multimedia chip 110 is not reading AGP command data from the AGP buffer 112. If it is idle, the method proceeds to step 714; otherwise, repeating step 712.

In step 714, the device driver 312 writes the beginning and ending addresses of the second AGP buffer 612 into the second beginning register 608 and second ending register 610 respectively. Then, step 716 is executed. In step 716, the device driver 312 triggers the multimedia chip 110 to read AGP command data from the second AGP buffer 612. The method then proceeds to step 718. In step 718, the device driver 312 is to determine whether there are any AGP command data to be written into the AGP buffer 112. If yes, the method repeats from step 702; otherwise, the method ends.

In terms of performance, the method shown in FIG. 7 is better than the method shown in FIG. 5. However, the former still has disadvantages. For example in step 704 or 712, the method proceeds to the next step when the multimedia chip 110 is idle, resulting in an additional waiting time. Besides, in the method shown in FIG. 7, all AGP command data must first fill in either the AGP buffer 606 or 612. When one of the two buffers is filled with AGP command data, the following AGP command data are allowed to be filled into the other buffer. In this way, the multimedia chip 110 must wait to perform reading of the AGP command data until one of the AGP buffers 606 and 612 is filled. Thus, it delays the multimedia chip 110 reading AGP command data, resulting in a reduction in system performance.

SUMMARY OF THE INVENTION

It is therefore an object of the invention to provide a method and system for buffer management. By the invention, the multimedia chip can read an AGP buffer with the least delay and without waiting for one or more AGP buffers to be filled completely. In this way, usage efficiency of the AGP buffers are increased, and the time spent waiting for the idle multimedia chip is reduced. Besides, the CPU can use the portion that the multimedia chip has read for storing new command data.

The invention achieves the above-identified object by providing a system for buffer management. The system includes a central processing unit, a multimedia chip, a buffer, a beginning register, an ending register, and a pause storage unit. The central processing unit (CPU) is to access a memory through a chipset, and the multimedia chip is coupled to the chipset via a bus. The buffer is used for storing a plurality of command data associated with a plurality of multimedia commands that the CPU is to send to the multimedia chip, wherein the multimedia chip reads the command data from the buffer and executes the command data. The beginning register is employed to store a beginning address of the buffer, and the ending register is used to store an ending address of the buffer or a buffer length. In addition, content of the pause storage unit includes a data address associated with the command data.

The invention achieves the above-identified object by providing a method for buffer management, for managing write operation for a first device to write pieces of data into a buffer, and read operation for a second device to read the pieces of the data from the buffer. The buffer has a beginning address, an ending address, a buffer length indicative of the size of the buffer. The method includes a write process and a read process, and uses a beginning register, an ending register, a pause storage unit, and a read pointer, wherein the read pointer is to point to an address of data being read from the buffer during the read operation. The write process includes the following steps. (a) Write a first piece of the data into the buffer, wherein the first piece of the data written into the buffer is associated with a first data address in the buffer. (b) Write the first data address into the pause storage unit. (c) Trigger the second device. (d) Repeat steps (a) to (d) when there are data left to be written into the buffer. In addition, before step (c) the write process further includes the step of (e) writing the beginning address into the beginning register, and writing the ending address or the buffer length into the ending register. On the other hand, the read process includes the following steps. (a1) Set the read pointer pointing to the first data address in the buffer. (b1) Read data of an address pointed to by the read pointer when the second device is triggered. (c1) Continuously read data next to the data of the address pointed to by the read pointer when the address pointed to by the read pointer is different from content of the pause storage unit, and read content of the beginning register when the address pointed to by the read pointer is identical to content of the ending register until all of the data are read.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIGS. 13A–13G illustrate the relation between registers and the AGP buffer that is managed according to the method shown in FIG. 12.

DESCRIPTION OF THE PREFERRED EMBODIMENT

Figure 1:
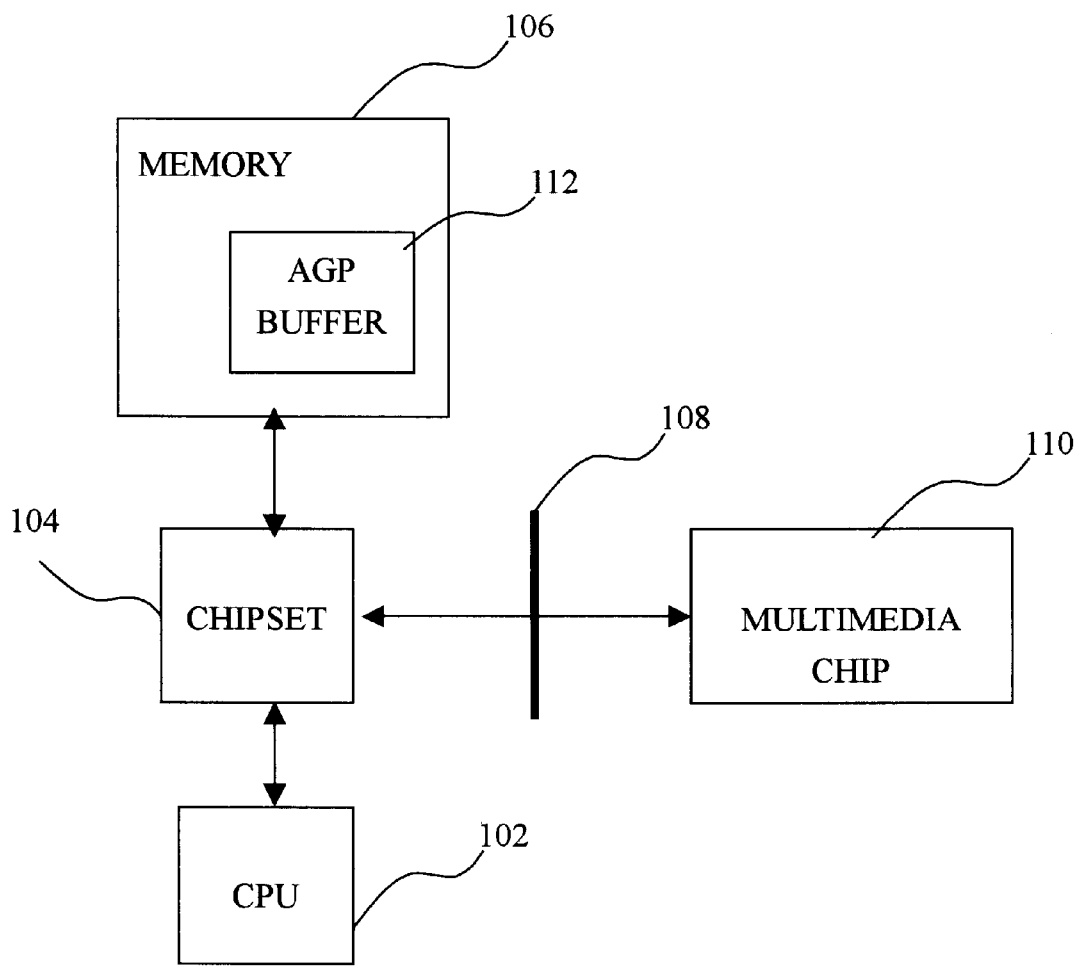
FIG. 1 is a block diagram showing a part of a structure of a conventional computer system.
Figure 2A:
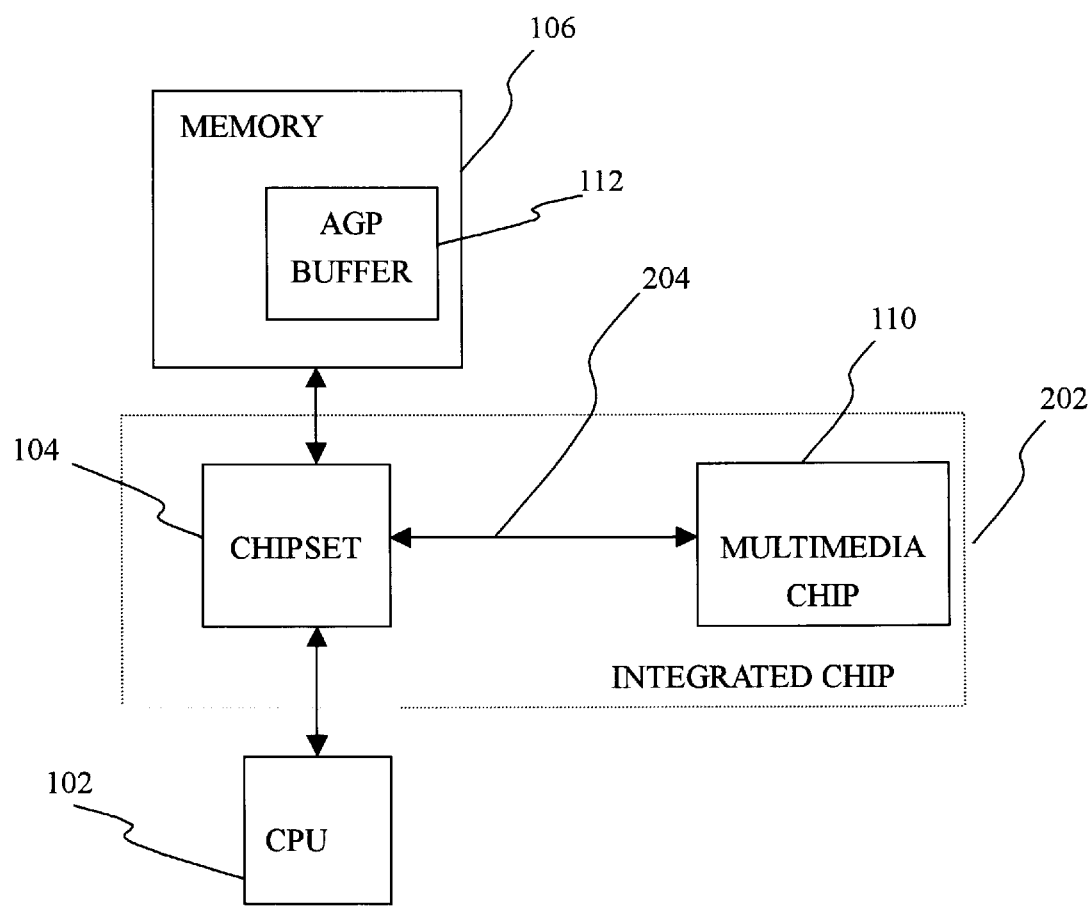
FIGS. 2A–2D are block diagrams showing a part of a structure of another conventional computer system.
Figure 2B:
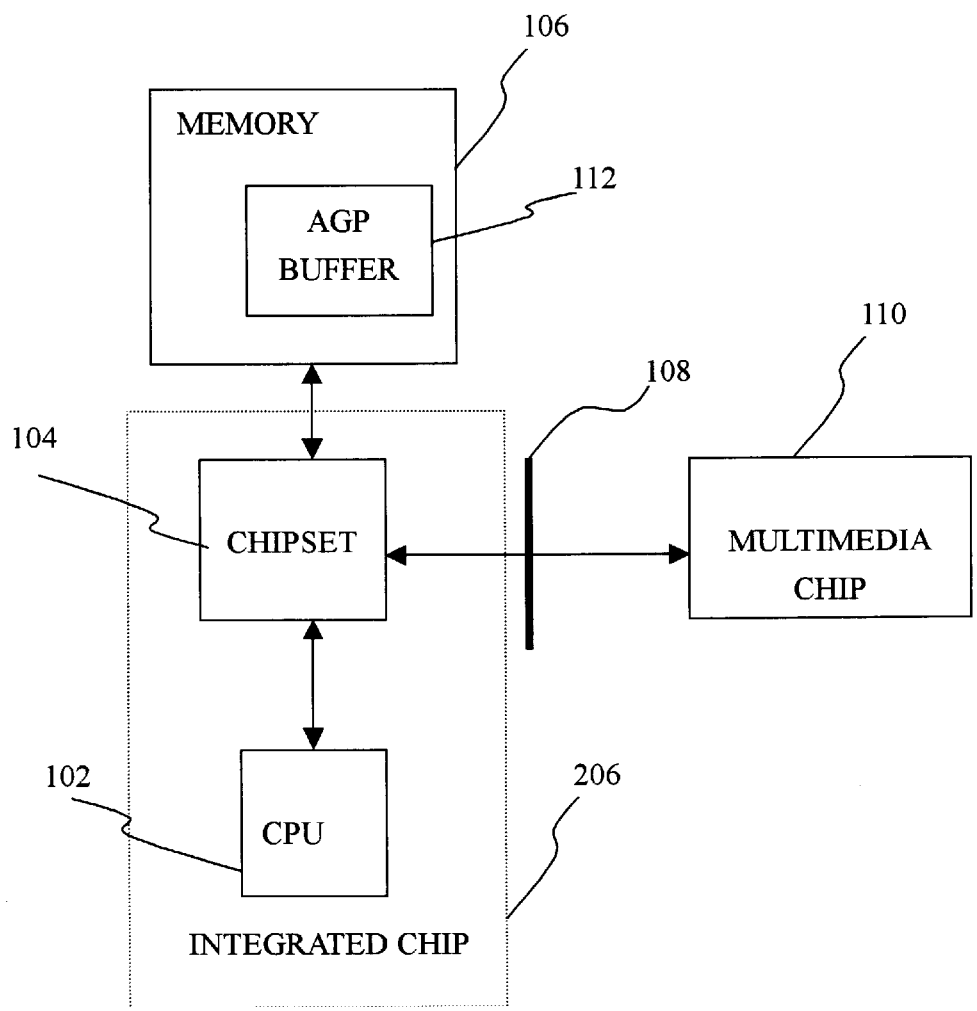
Figure 2C:
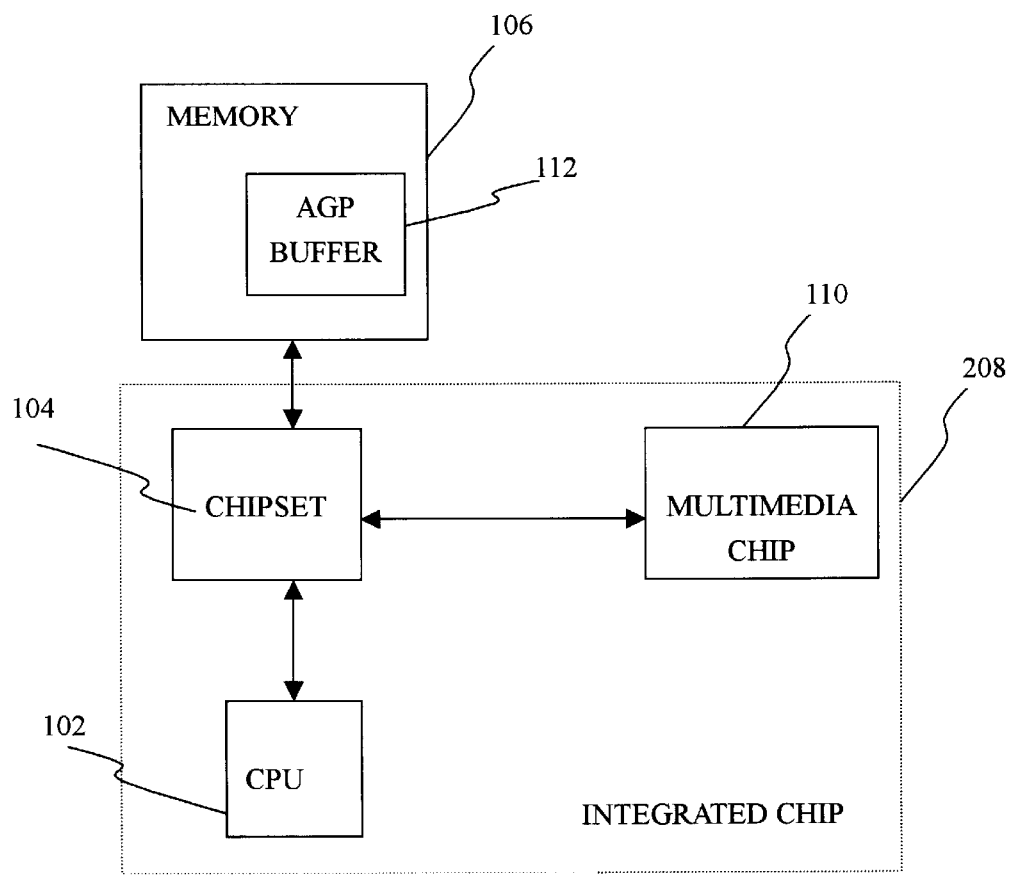
Figure 2D:
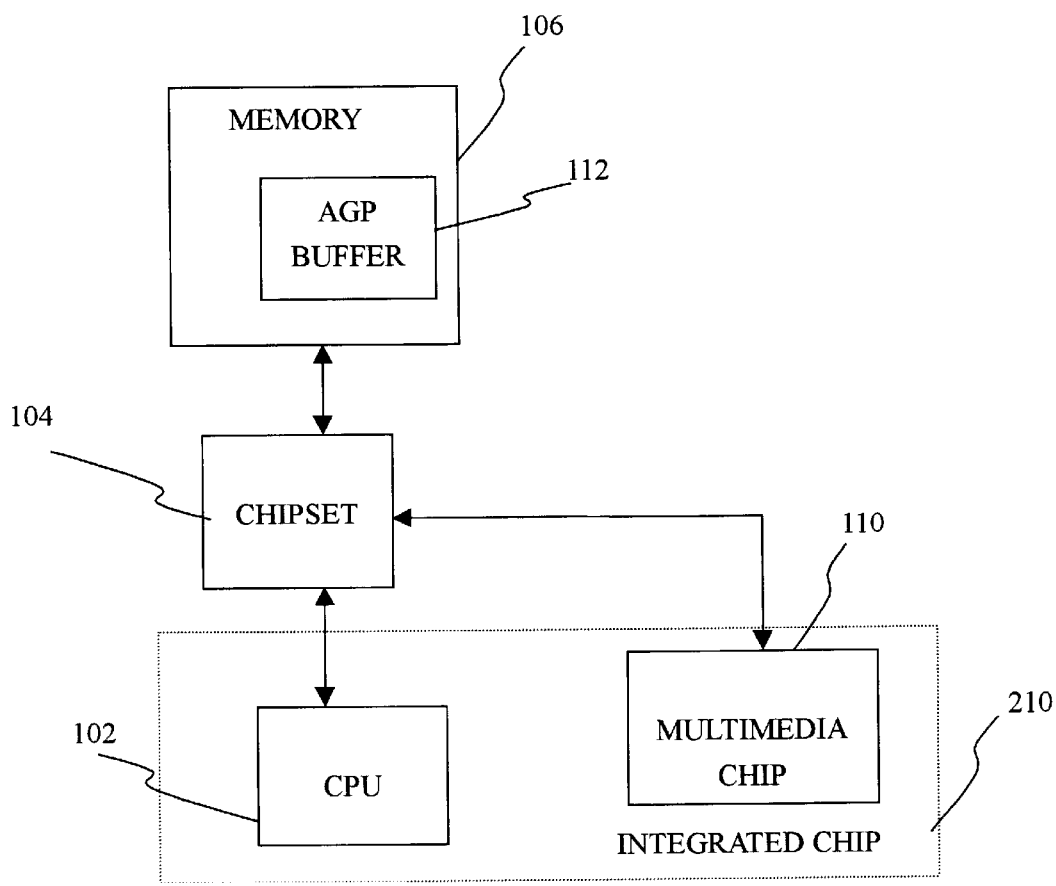
Figure 3:
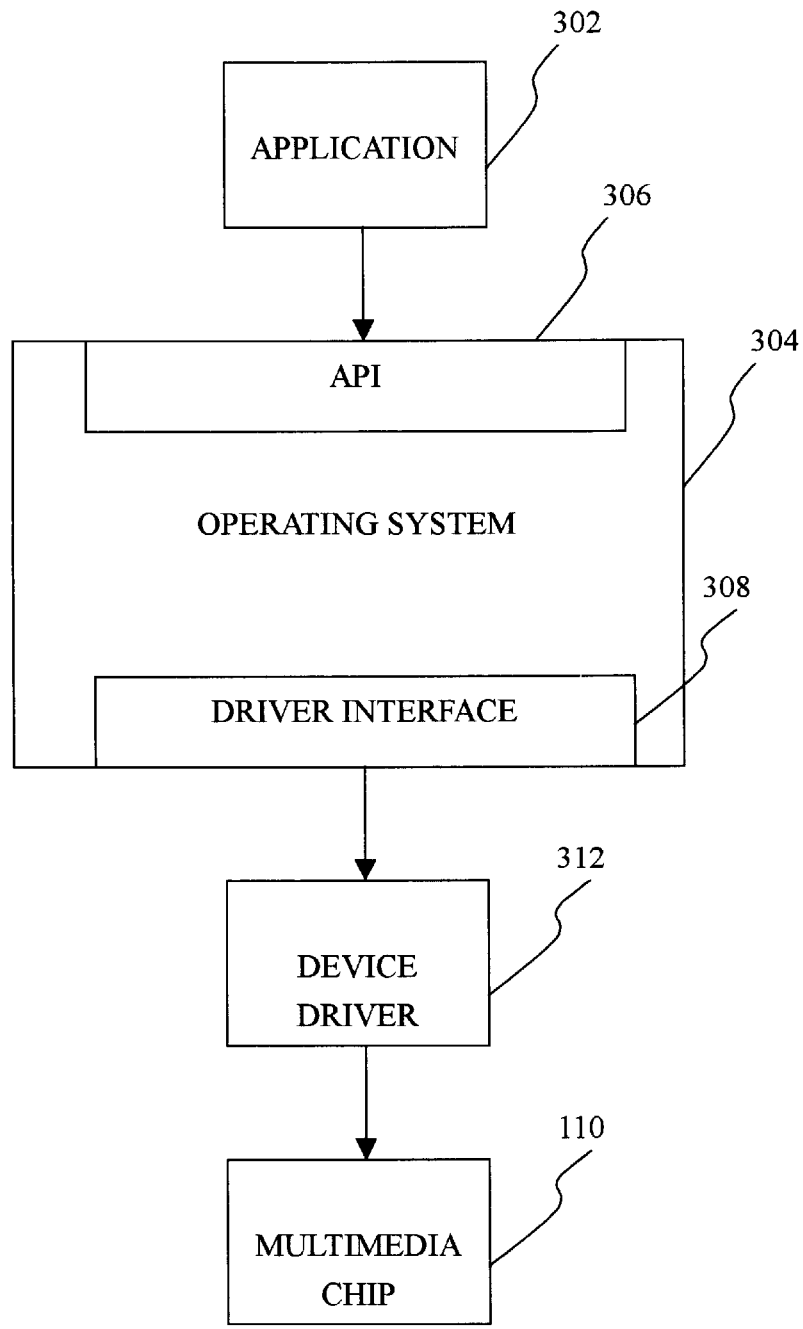
FIG. 3 illustrates the relation between software and hardware in conventional computer systems.
Figure 4:
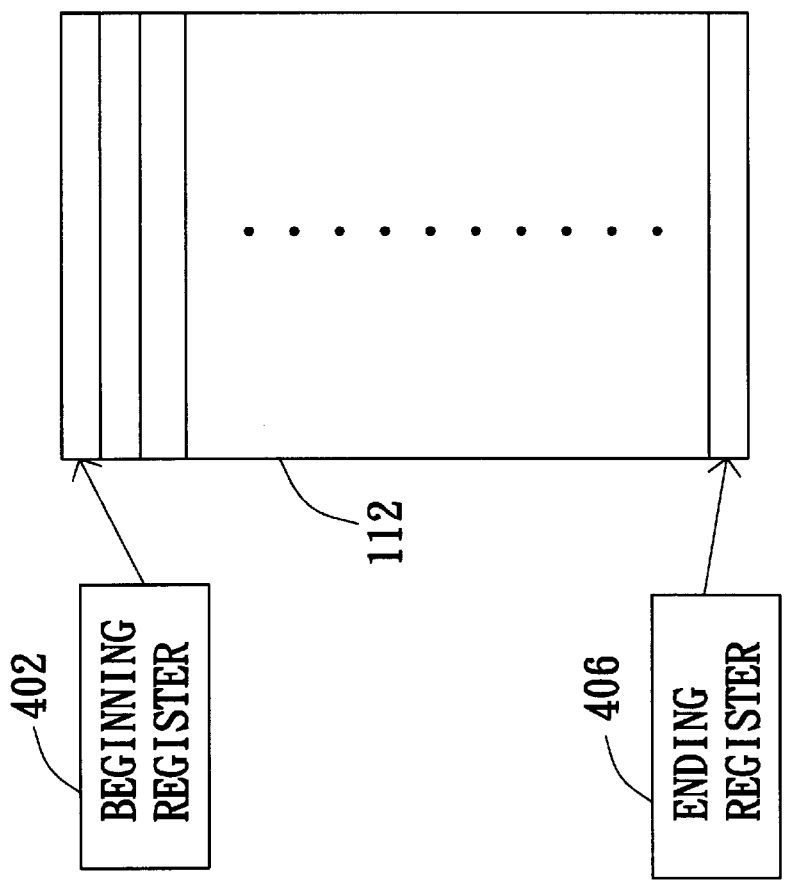
FIG. 4 illustrates a first conventional AGP buffer.
Figure 5:
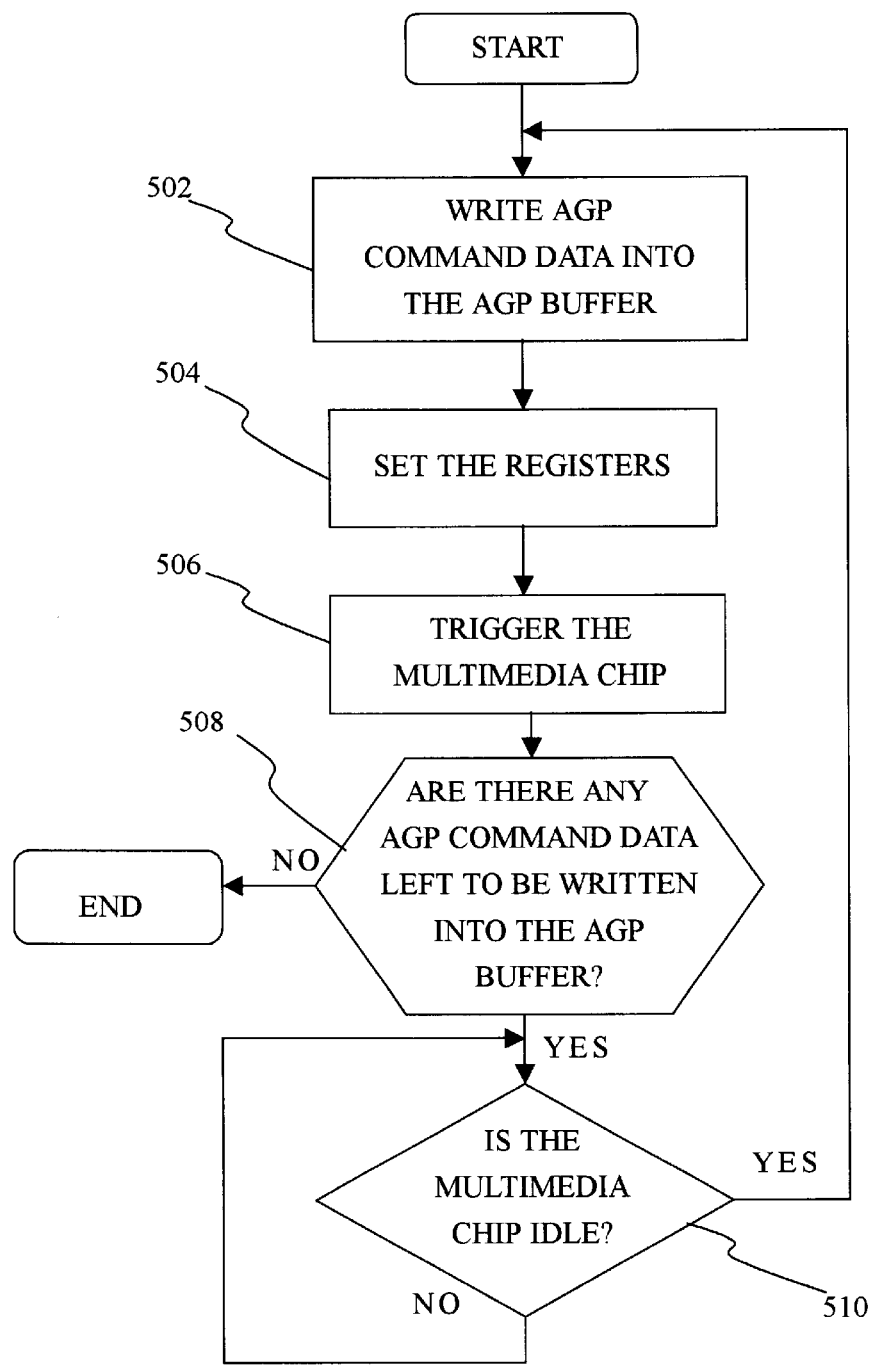
FIG. 5 is a flowchart showing a method for managing the buffer shown in FIG. 4.
Figure 6:
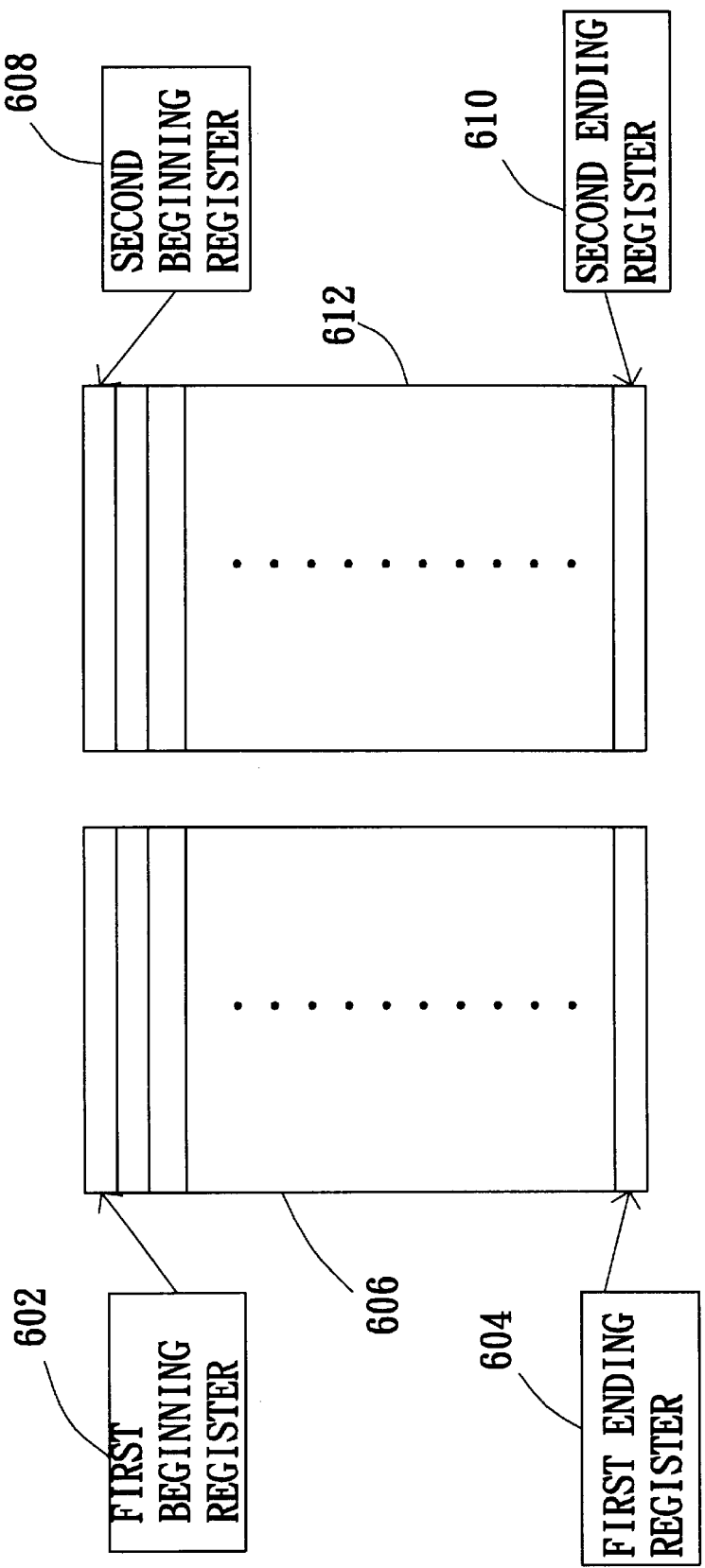
FIG. 6 illustrates a second conventional AGP buffer.
Figure 7:
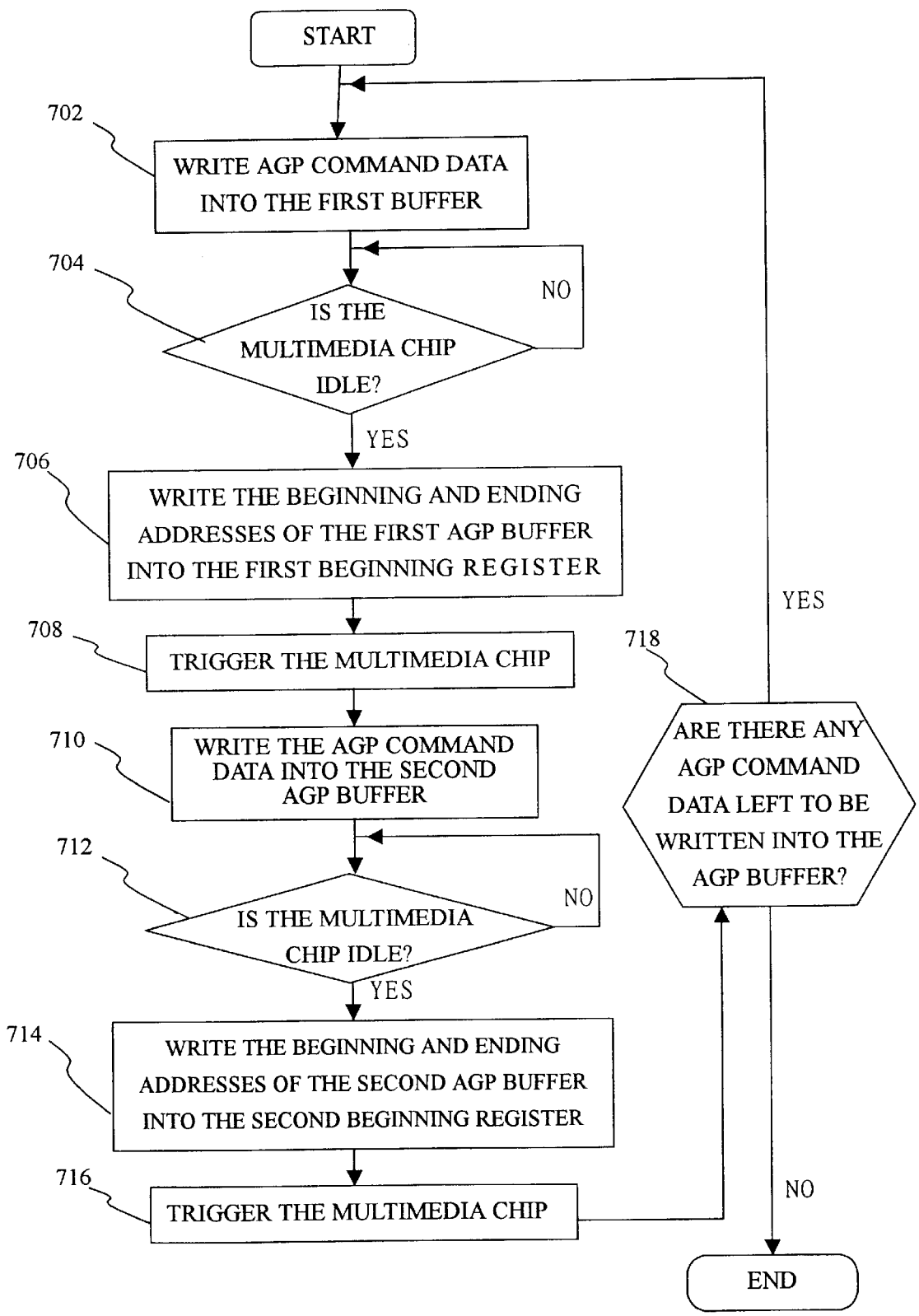
FIG. 7 is a flowchart showing a method for managing the buffer shown in FIG. 6.
Figure 8:
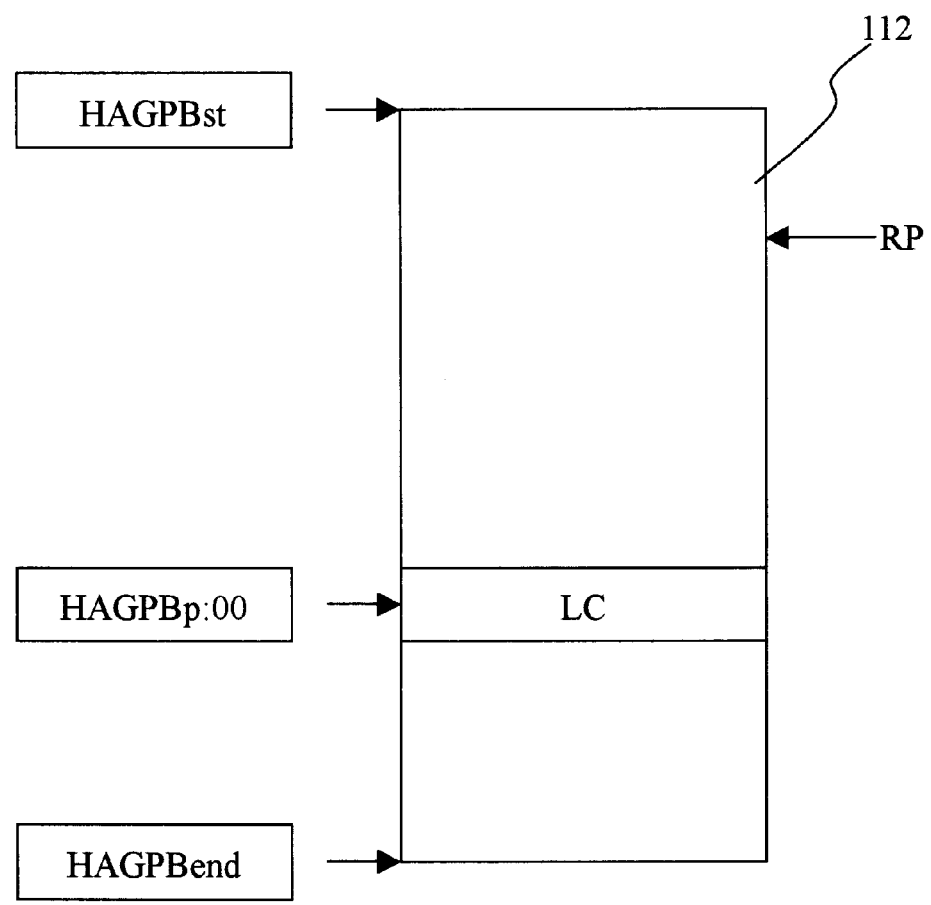
FIG. 8 illustrates a structure of an AGP buffer according to a preferred embodiment of the invention.

Referring to FIG. 8, it illustrates a structure of an AGP buffer according to a preferred embodiment of the invention. In this structure, three registers are employed: a beginning register HAGPBst, an ending register HAGPend, and a pause register HAGPBp. The beginning register HAGPBst stores the beginning address of the AGP buffer 112, and the ending register HAPGend stores the ending address of the AGP buffer 112. The pause register HAGPBp can be defined to store an address LC which is finally read by the multimedia chip 110. In addition, a read pointer is employed to point to an address associated with the AGP command data which is reading by the multimedia chip 110.

Moreover, the pause register HAGPBp can also be defined to point to an address which is either one before or one next to the address which is finally read by the multimedia chip 110. In the embodiment, the pause register HAGPBp is defined to store an address which is finally read by the multimedia chip 110. In addition, the last two bits of the pause register HAPGBp is defined as a code, called pause code, for indicating the next operation to be executed when the multimedia chip 110 has read a multimedia command stored in an address pointed to by the pause register HAGPBp.

The pause register HAGPBp along with the pause code of different values is defined as follows.

For the pause register HAGPBp with the pause code of 00, denoted by HAGPBp:00, its content is a pause address during reading AGP command. In this case, after the read operation pauses, if the multimedia chip is to execute AGP command data, the AGP command data is read from one next to the address which is pointed to by the pause register HAGPBp.

For the pause register HAGPBp with the pause code of 01, denoted by HAGPBp:01, its content is an ending address of a portion of the AGP command data. In this case, when the multimedia chip 110 reads the address pointed to by the pause register HAGPBp:01, the multimedia chip 110 immediately reads the next AGP command data from the address pointer to by the beginning register HAGPBst and there is no pause or waiting time between the two read operations.

For the pause register HAGPBp with the pause code of 10, denoted by HAGPBp:10, its content is an ending address the AGP command data. In this case, whenever the multimedia chip 110 reads the address stored in the pause register HAGPBp:10, the read operation for the AGP command data is finished.

In addition, the pause codes can be considered to indicate three pause states of the pause register HAGPBp.

Referring to FIG. 8, the pause code of 00 is used. In this way, when the multimedia chip 110 reads an address pointed to by the pause register HAGPBp:00, the multimedia chip 110 stops reading the AGP buffer 112 until the read pointer PR and the address pointed to by the pause register HAGPBp:00 are unequal. Until then, the multimedia chip 110 resumes reading AGP command data in the AGP buffer 112 from one address next to the address pointed to by the pause register HAGPBp:00. If the address pointed to by the pause register HAGPBp:00 is the ending address of the AGP buffer, the multimedia chip 110 executes the next read operation from the beginning address of the AGP buffer 112. In addition, the pause code in FIG. 8 is to be fixed at 00, resulting in the AGP buffer becoming a ring AGP buffer.

Figure 9:
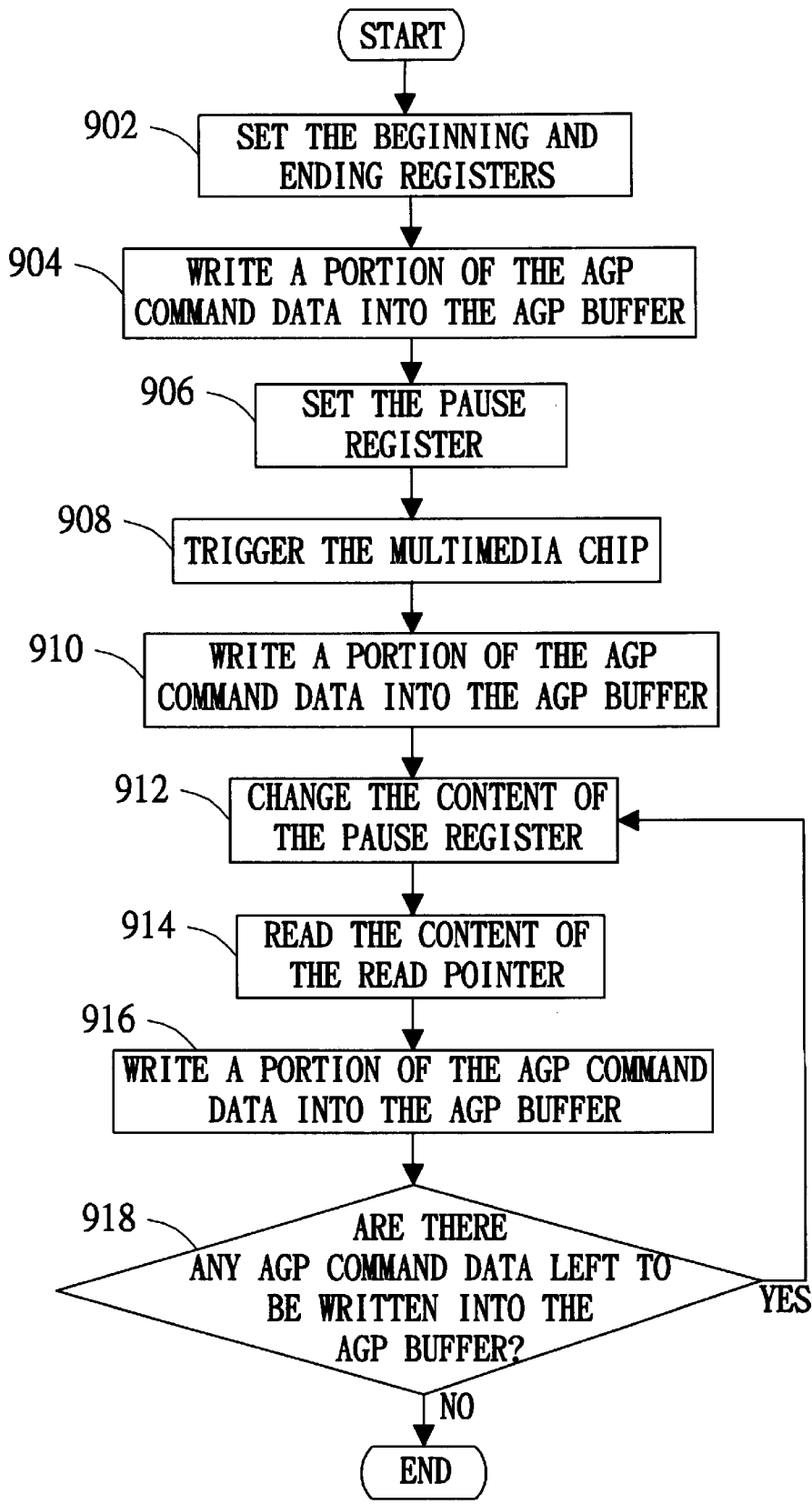
FIG. 9 is a flowchart showing a method of managing the AGP buffer in FIG. 8 according to the preferred embodiment of the invention.

Referring to FIG. 9, it illustrates a method for AGP buffer management according to a preferred embodiment of the invention. The method begins and proceeds to step 902. In step 902, the device driver 312 performs setting for the beginning register HAGPBst and the ending register HAGPBend. That is to write the beginning address and the ending address of the AGP buffer to be used into the beginning register HAGPBst and the ending register HAGPBend. Then, the method proceeds to step 904. In step 904, the device driver 312 writes a portion of the AGP command data into the AGP buffer 112. Next, step 906 is executed, in which the device driver 312 performs setting for the pause register HAGPBp, i.e. the address of the last AGP command data in the AGP buffer 112 is written into the pause register HAGPBp.

Further, in step 908, the multimedia chip 110 is triggered to continuously read and execute the AGP command data in the AGP buffer 112. During step 908, the address pointed to by the read pointer RP varies with the address of the AGP command data read by the multimedia chip 110, that is, the read pointer RP pointing to the address of the AGP command data being read by the multimedia chip 110. Next, the method proceeds to step 910. In step 910, the device driver 312 continuously writes a portion of the AGP command data into the AGP buffer 112, and the method then proceeds to step 912. In step 912, the device driver 312 changes the content of the pause register HAGPBp, that is, the pause register HAGPBp is set to the address associated with the last AGP command data written into the AGP buffer 112 in step 910.

Then, the method proceeds to step 914 in which the device driver 312 reads the current content of the read pointer RP so as to obtain the address of the AGP command data which the multimedia chip 110 is reading from the AGP buffer 112. From steps 908 to 914, since the multimedia chip 110 has been triggered, the AGP command data are read continuously, and the read pointer RP varies as well.

The method then proceeds to step 916 in which the device driver 312 writes a portion of the AGP command data into the AGP buffer 112. During the writing of the AGP command data, the respective addresses cannot identical to or exceeds the read pointer's address in order to prevent the AGP command data being written into from covering the AGP command data not to be read.

Next, step 918 is performed to determine whether the device driver 312 has AGP command data left to be written into the AGP buffer 112. If not, the method is terminated. If yes, steps 912 to 918 are repeated. That is to say that it is to change the content of the pause register HAGPBp, read the content of the read pointer RP, and continue writing a portion of the AGP command data into the AGP buffer 112. Simultaneously, the multimedia chip 110 is reading the AGP command data and changing the associated address to which the read pointer points.

Besides, the write operation for the device driver 312 to write the AGP command data into the AGP buffer 112 and the read operation for the multimedia chip 110 to read the AGP command data from the AGP buffer 112 are processed in parallel. In addition, in order to prevent the multimedia chip 110 from reading a portion of the AGP buffer 112 which has not been written by the device driver 312, when the multimedia chip 110 is to read from the address pointed to by the pause register HAGPBp, the read operation is stopped until the pause register HAGPBp points to a different address.

Moreover, the read operation for the multimedia chip 110 to read from the AGP buffer 112 can start immediately after setting the pause register HAGPBb. Further, this read operation will not stop or be affected when the device driver 312 reads the read pointer RP.

Firstly, the read operation of reading the AGP buffer 112 is performed in a short time. Thus, after each reading for the read pointer RP, it is to define a maximum writable space in the AGP buffer 112 before the read pointer is reached. In addition, when the device driver 312 reads the read pointer RP in the next time, the multimedia chip 110 will have read a portion of the AGP command data from the AGP buffer 112 so that the read pointer RP to be read lies apart from the previously-read read pointer RP. When the size of the AGP buffer 112 is made larger, this effect is more apparent. The size of the AGP buffer 112 is generally defined to be exceeding 256 KB or 1 MB.

Figure 10:
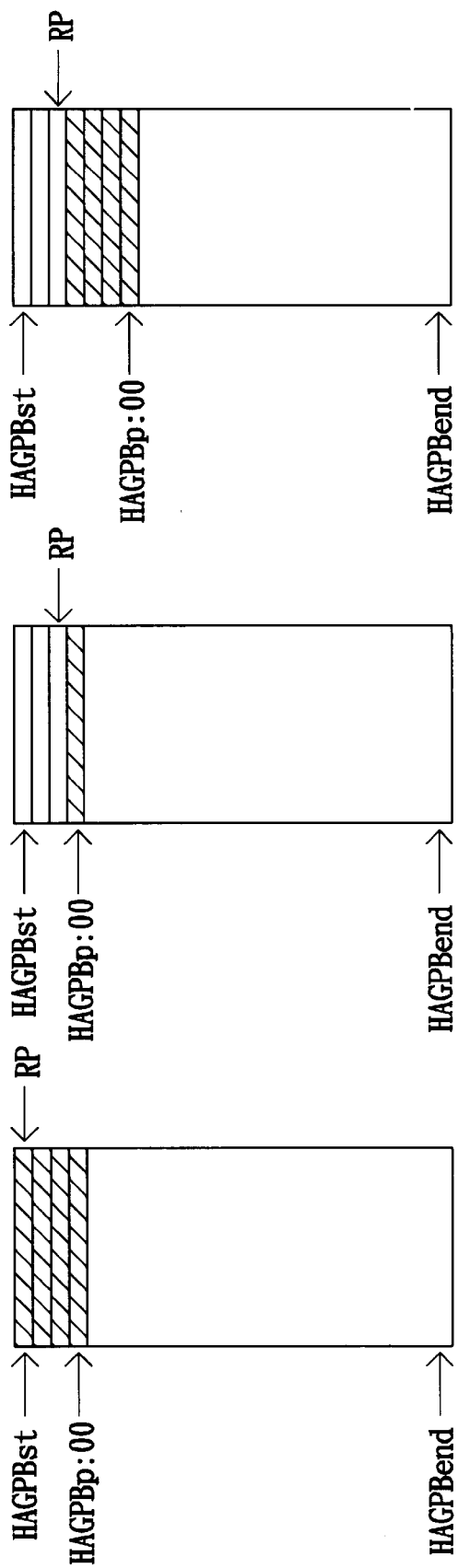
FIGS. 10A–10C illustrate the relation between registers and the AGP buffer that is managed according to the method shown in FIG. 9.

Referring to FIGS. 10A–10B, they illustrate the relation between the registers and the buffer managed by the method in FIG. 9. FIG. 10A shows the relation between the registers and the AGP buffers after the device driver 312 completes steps 902 to 906 in FIG. 9. In FIG. 10A, the device driver 312 writes a portion of the AGP command data, for example, four pieces of the AGP command data, into the AGP buffer 112, and sets the pause register HAGPBp pointing to the last one of the four pieces of the AGP command data. FIG. 10B shows the relation between the registers and the AGP buffer after the device driver 312 completes step 908. In FIG. 10B, the multimedia chip 110, after triggered by the device driver 312, starts reading AGP command data. For instance, three pieces of the AGP command data are read and the read pointer RP then points to the last address that the multimedia chip 110 read.

FIG. 10C shows the relation between the registers and the AGP buffer after steps 910 to 914. The device driver 312 continues to write AGP command data into the AGP buffer 112 and change the content of the pause register HAGPBp. After that, the device driver 312 reads the content of the read pointer RP so as to obtain a maximum writable space in the AGP buffer such as the portion without oblique lines inside the AGP buffer represented by a large rectangular.

In the method above, the multimedia chip 110 is triggered to start reading AGP command data when the device driver 312 writes a portion of the AGP command data into the AGP buffer 112. It is different from the conventional method in which the multimedia chip is triggered only when all AGP command data are written into the AGP buffer by the device driver. In this way, the method for buffer management according to the invention makes the read operation for the multimedia chip 110 faster as compared with the conventional method.

Further, when the device driver 312 completes setting the pause register HAGPBp, the multimedia chip 110 is triggered to resume writing AGP command data into the AGP buffer. This is different from the conventional method in which it takes a large amount of time in waiting for the multimedia chip 110 being in idle. In this way, the method for buffer management according to the invention is much faster than the conventional one and makes use of the memory space more effectively.

Figure 11:
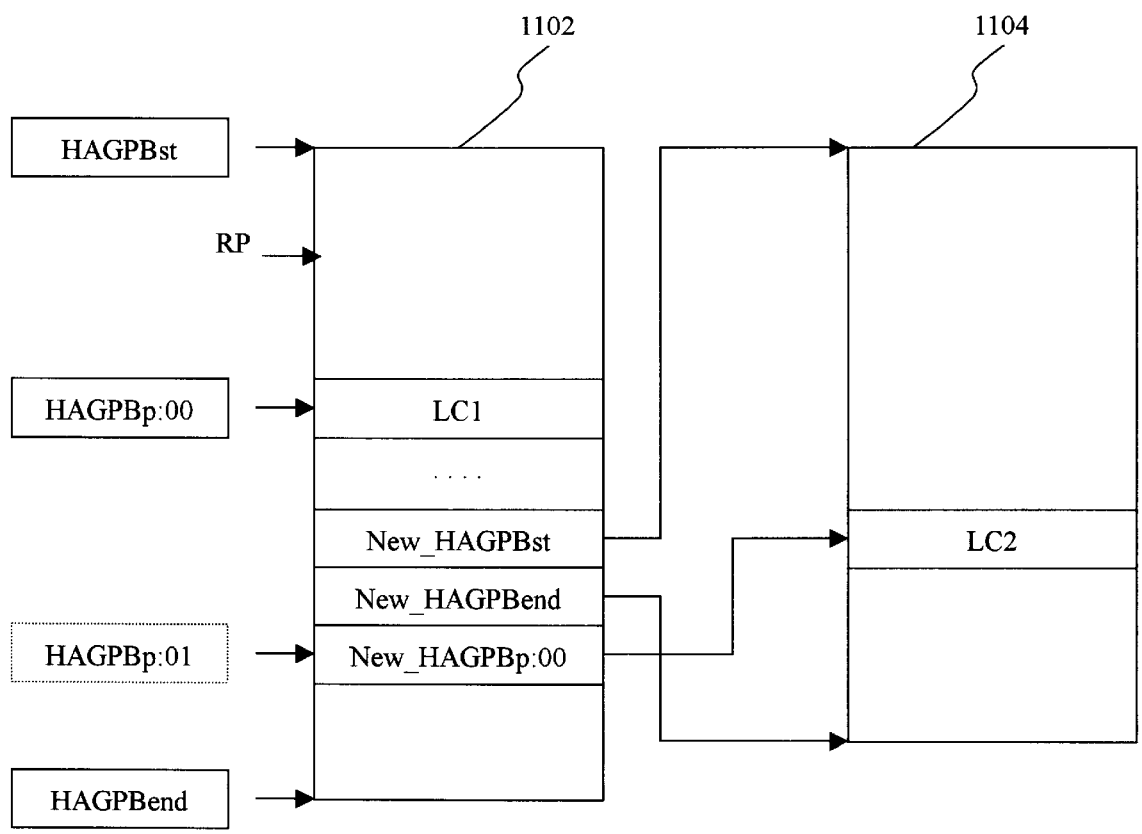
FIG. 11 illustrates a structure of another AGP buffer according to the preferred embodiment of the invention.

Referring to FIG. 11, it illustrates a structure of another AGP buffer according to the preferred embodiment of the invention. As compared with FIG. 8 in which a ring AGP buffer is illustrated, FIG. 11 shows a multiple buffer according to the invention.

In FIG. 11, the multiple buffer includes a first buffer 1102 and a second buffer 1104 while three registers mentioned above are employed, namely, the beginning register HAGPBst, the ending register HAGPBend, and the pause register HAGPBp.

Figure 12:
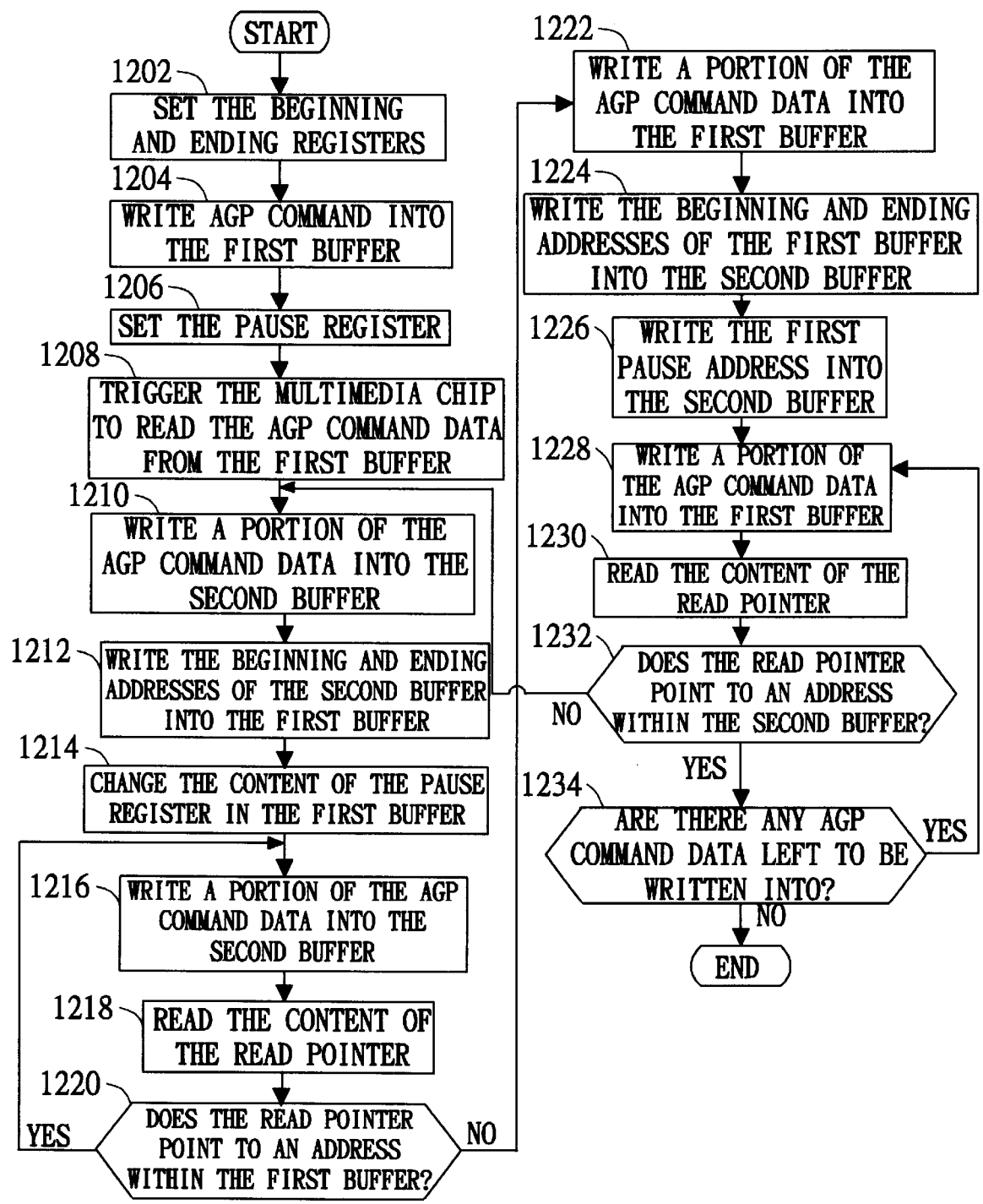
FIG. 12 is a flowchart showing a method of managing the AGP buffer in FIG. 11 according to the preferred embodiment of the invention.

Referring to FIG. 12, it illustrates another method for buffer management according to the preferred embodiment of the invention. The method is for managing a multiple buffer as follows. The method begins and proceeds to step 1202. In step 1202, the device driver 312 sets the beginning register HAGPBst and the ending register HAGPBend, that is, the beginning address and the ending address of the first buffer 1102 are stored in the HAGPBst and HAGPBend respectively. Step 1204 is then performed that the device driver 312 writes AGP command into the first buffer 1102. Next, the method proceeds to step 1206. In step 1206, the device driver 312 sets the pause register HAGPBp pointing to an address in the first buffer 1102, where the address is associated with the last AGP command that the device driver 312 wrote and the pause code is set to 00. For instance, the pause register HAGPBp points to the last AGP command data LC1 as shown in FIG. 11.

Then, the method proceeds to step 1208, in which the device driver 312 triggers the multimedia chip 110 to read AGP command data. After that, step 1210 is performed to write a portion of the AGP commands into the second buffer 1104, and the method proceeds to step 1212. In step 1212, the beginning address and the ending address of the second buffer 1104, which are regarded as AGP command data, are written into the first buffer 1102. That is, address values for the updating of the beginning and ending registers, New_HAGPBst and New_HAGPBend, as shown in FIG. 11, are written into the first buffer 1102. In addition, AGP command data are continuously written into the second buffer 1104. Moreover, the address of the last piece of the AGP command data LC2 that the device driver 312 writes into the second buffer 1104 is regarded as AGP command data, and written into the first buffer 1102. That is to say that the first buffer 1102 stores an address value for the updating of the pause register, New_HAGPBp, as well as New_HAGPBst and New_HAGPBend.

Following that, the method proceeds to step 1214, in which the device driver 312 changes the content of the pause register HAGPBp in the first buffer 1102. That is to say that the pause register is changed and set to the address at which the address value for the updating of the pause register, New_HAGPBp, is stored. In addition, the pause code is set to 01. Referring to FIG. 11, it shows that the pause register HAGPBp:01, enclosed by a rectangle bordered with dotted line, is set after step 1214.

After that, step 1216 is performed. In step 1216, the device driver 312 writes a portion of the AGP command data into the second buffer 1104. The method then proceeds to step 1218, in which the device driver 312 reads the content of the read pointer RP. Next, step 1220 is executed. In step 1220, the device driver 312 determines whether the read pointer RP points to an address between the beginning address and ending address of the first buffer 1102. If yes, step 1216 is repeated. If not, the method proceeds to step 1222.

In step 1222, a portion of the AGP command data is written into the first buffer 1102. Next, step 1224 is performed to write the beginning address and ending address of the first buffer 1102, regarded as AGP command data, into the second buffer 1104. The method then proceeds to step 1226. In step 1226, the address of the last command data that the device driver 312 writes into the first buffer 1102 is defined as a first pause address in the first buffer 1102, and is written into the second buffer 1104, regarded as AGP command data.

Afterward, step 1228 is performed to write a portion of the AGP command data into the first buffer 1102. The method then proceeds to step 1230 where the device driver 312 reads the content of the read pointer RP. Next, step 1232 is executed. In step 1232, the device driver 312 determines whether the read pointer points to an address between the beginning address and ending address of the second buffer 1104. If not, step 1210 is repeated. If yes, the method proceeds to step 1234. If yes, step 1228 is repeated. If not, the method ends.

Figure 13B:
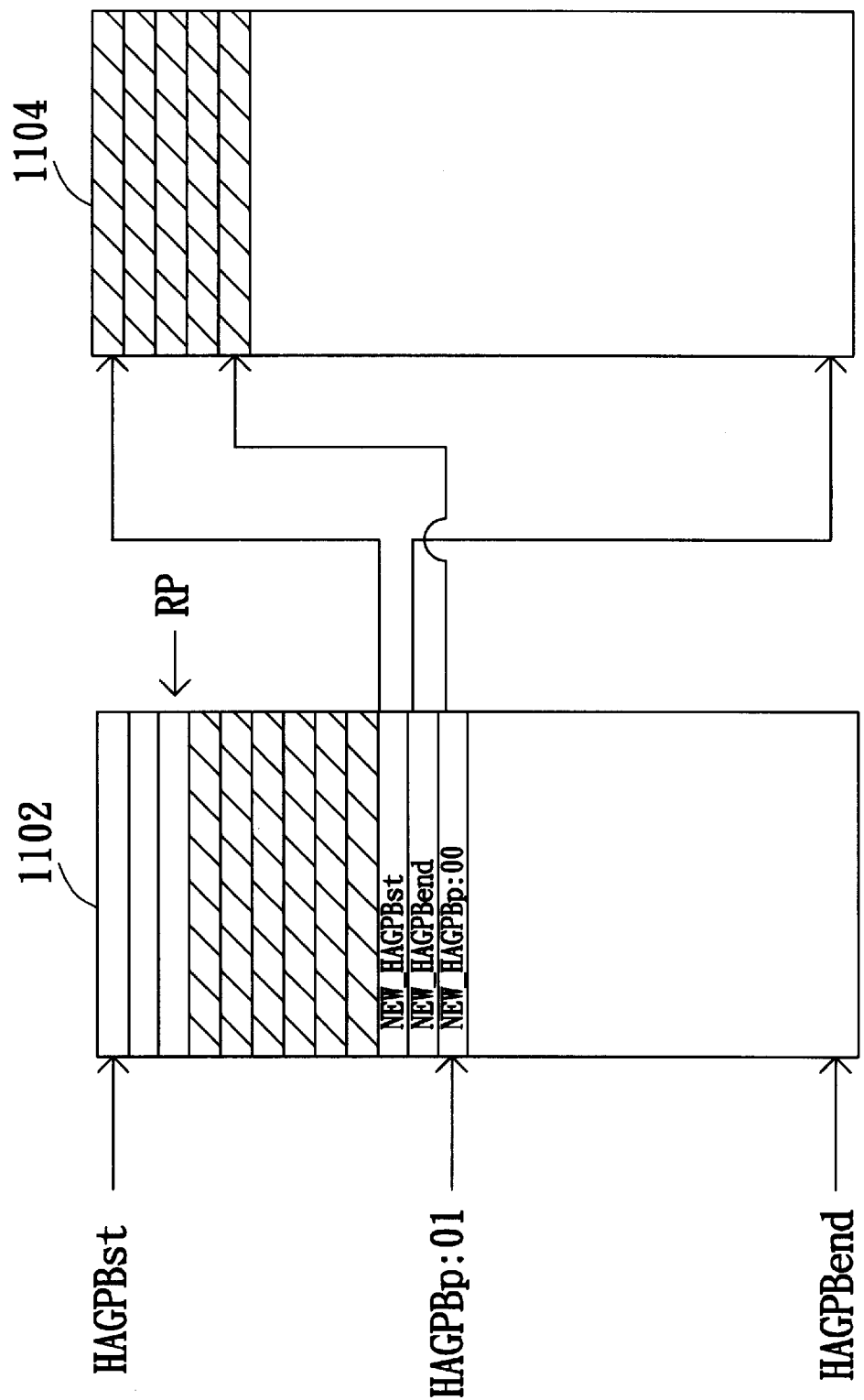

Referring to FIGS. 13A–13G, they illustrate the relation between the registers and the AGP buffers managed by the method according to FIG. 12. FIG. 13A illustrates the relation between the registers and the first and second buffers 1102 and 1104 after steps 1202 to 1206 are performed. Then, the pause register HAGPBp has a pause code of 00, and points to the address at which the device driver 312 stores the last AGP command data.

FIG. 13B illustrates the relation between the registers and the first and second buffers 1102 and 1104 after steps 1208 to 1214 are completed. After the device driver 312 triggers the multimedia chip 110, the multimedia chip 110 begins to read AGP command data from the first buffer 1102. During the reading of the AGP command data, the read pointer points to the address of the last AGP command data that the multimedia chip 110 reads. After triggering the multimedia chip 110, the device driver 312 starts writing a portion of the AGP command data into the second buffer 1104, and writing the beginning, the ending, and the second pause addresses of the second buffer 1104 into the first buffer 1102, denoted by New_HAGPBst, New_HAGPBend, and New_HAGPBp:00, respectively.

Figure 13C:
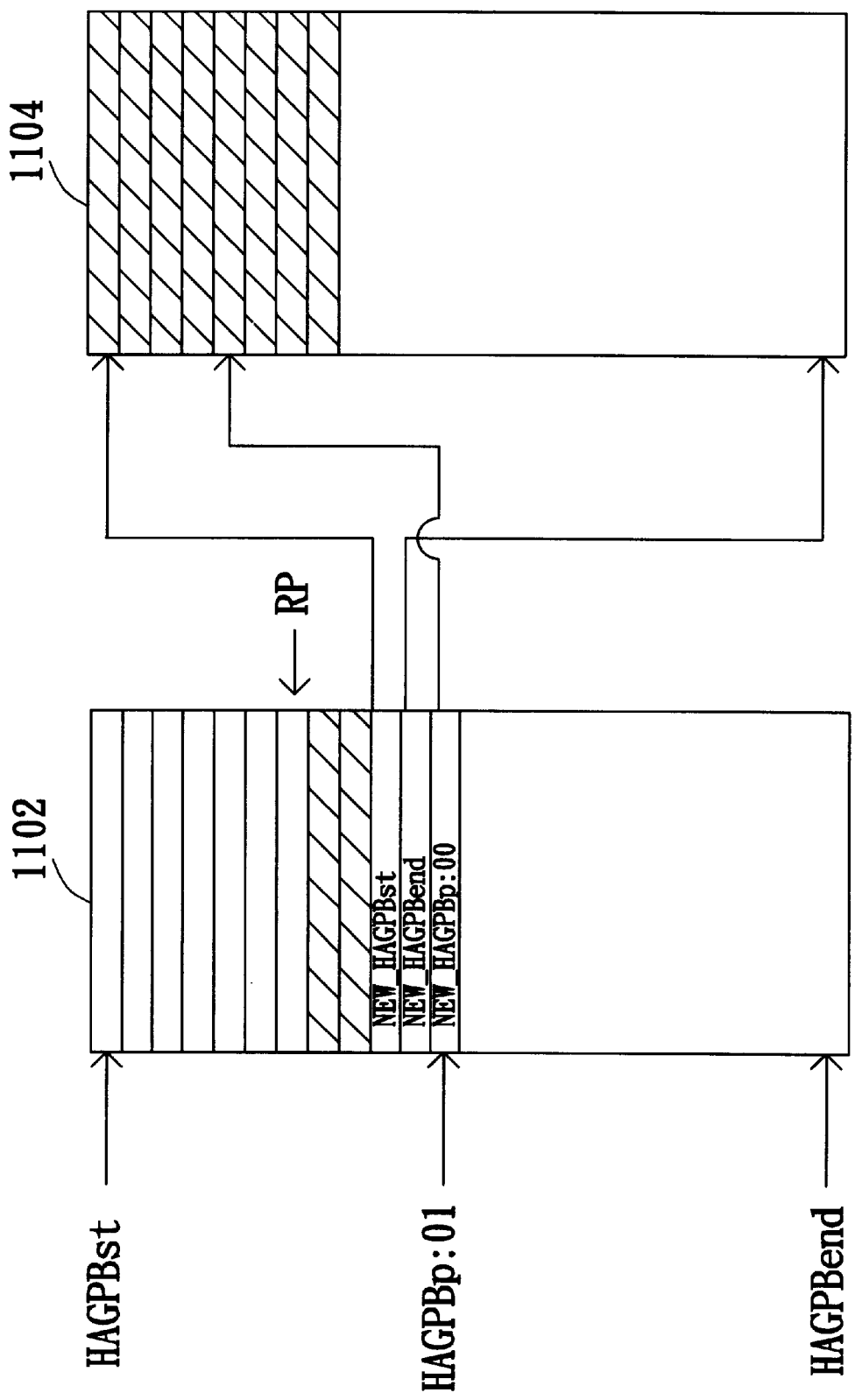

Referring to FIG. 13C, it illustrates the relation between the registers and the first and second buffers 1102 and 1104 after steps 1216 to 1220 are completed. During these steps, the device driver 312 continuously writes AGP command data into the second buffer 1104, and the multimedia chip 110 continuously reads the AGP command data. Besides, the read pointer RP is changing and points to different address according to the read operation for the multimedia chip 110 to read AGP command data, towards the ending of the first buffer 1102.

Figure 13D:
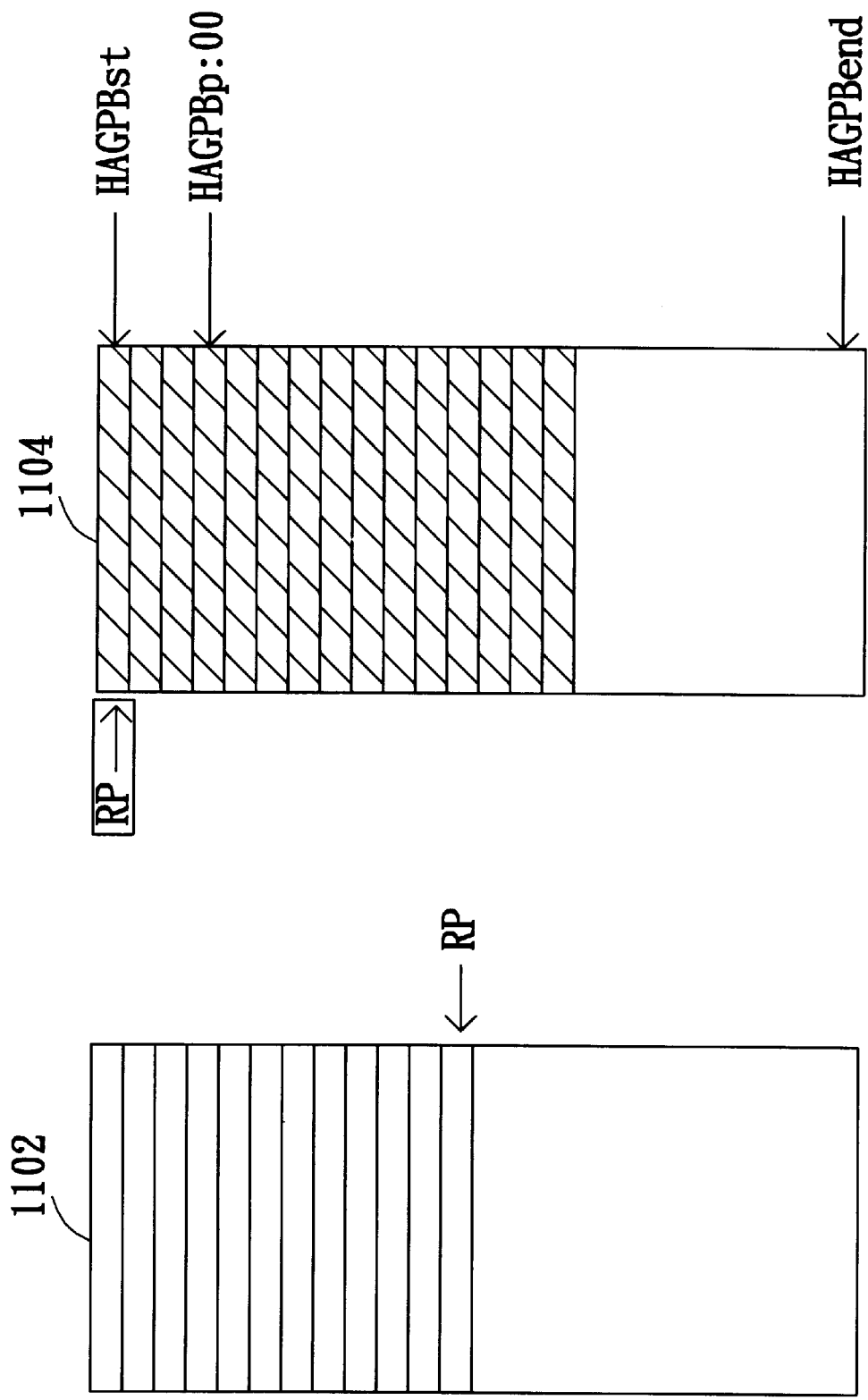

FIG. 13D also illustrates the relation between the registers and the first and second buffers 1102 and 1104 after steps 1216 to 1220 are completed. From FIG. 13C to FIG. 13D, the multimedia chip 110 sequentially reads the beginning, the ending, and the second pause addresses of the second buffer 1104, New_HAGPBst, New_HAGPBend, and New_HAGPBp:00, respectively from the first buffer 1102; these address values are stored in the first buffer 1102 in the form of AGP command data. When the multimedia chip 110 reads the beginning address of the second buffer 1104, New_HAGPBst, the content of the beginning register HAGPBst is set to the beginning address of the second buffer 1104. When the multimedia chip 110 reads the ending address of the second buffer 1104, New_HAGPBend, the ending address of the second buffer 1104 is assigned to the ending register HAGPBend. Then, the multimedia chip 110 reads the address pointed to by the pause register HAGPBp:01, that is, the second pause address New_HAGPBp:00 of the second buffer 1104. When the multimedia chip 110 reads the address pointed to by the pause register HAGPBp:01, the multimedia chip 110, according to the definition of the pause code 01, is to read AGP command data from the address pointed to by the beginning register HAGPBst, that is, the beginning address of the second buffer 1104, continuously and directly. In this way, when the multimedia chip 110 reads the second pause address New_HAGPBp:00 of the second buffer 1104, the second pause address of the second buffer 1104 is assigned to the pause register HAGPBp:00, and the multimedia chip 110 starts reading AGP command data from the beginning address of the second buffer 1104. In FIG. 13D, the symbol of the read pointer RP that is enclosed by a rectangle represents the read pointer RP pointing to the beginning address of the second buffer 1104 when the multimedia chip 110 performs read operation again.

Figure 13E:
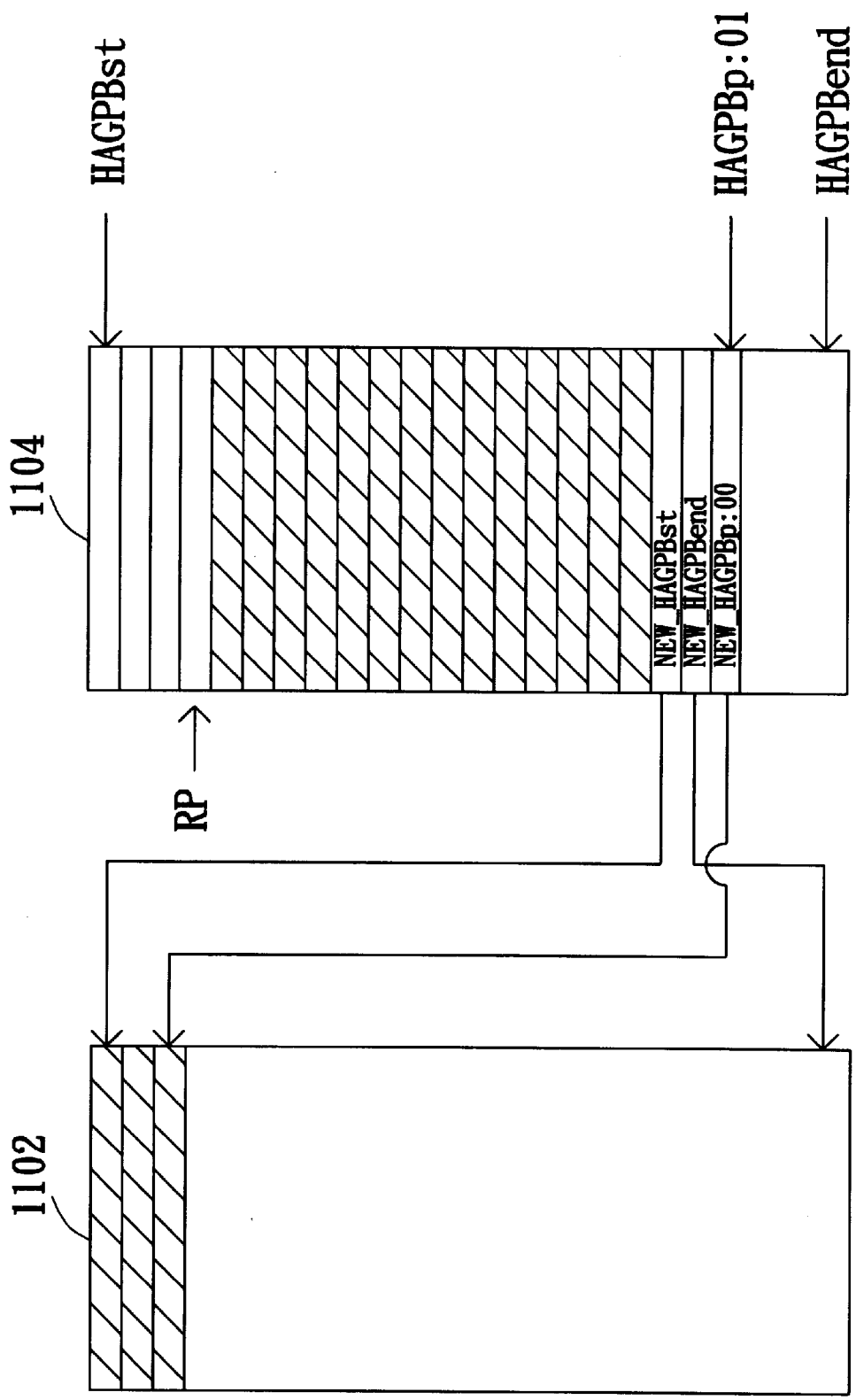

FIG. 13E illustrates the relation between the registers and the first and second buffers 1102 and 1104 after steps 1220 to 1226 are completed. When the address pointed to by the read pointer RP is in the second buffer 1104, the device driver 312 starts writing AGP command data into the first buffer 1102. In addition, the beginning address New_HAGPBst, the ending address New_HAGPBend, and the first pause address New_HAGPBp:00 of the first buffer 1102 are stored in the second buffer 1104 respectively. Then, the pause code of the pause register HAGPBp is changed from 00 to 01, and the pause register HAGPBp is set to the address at which the first pause address New_HAGPBp:00 of the first buffer 1102 is stored.

Figure 13F:
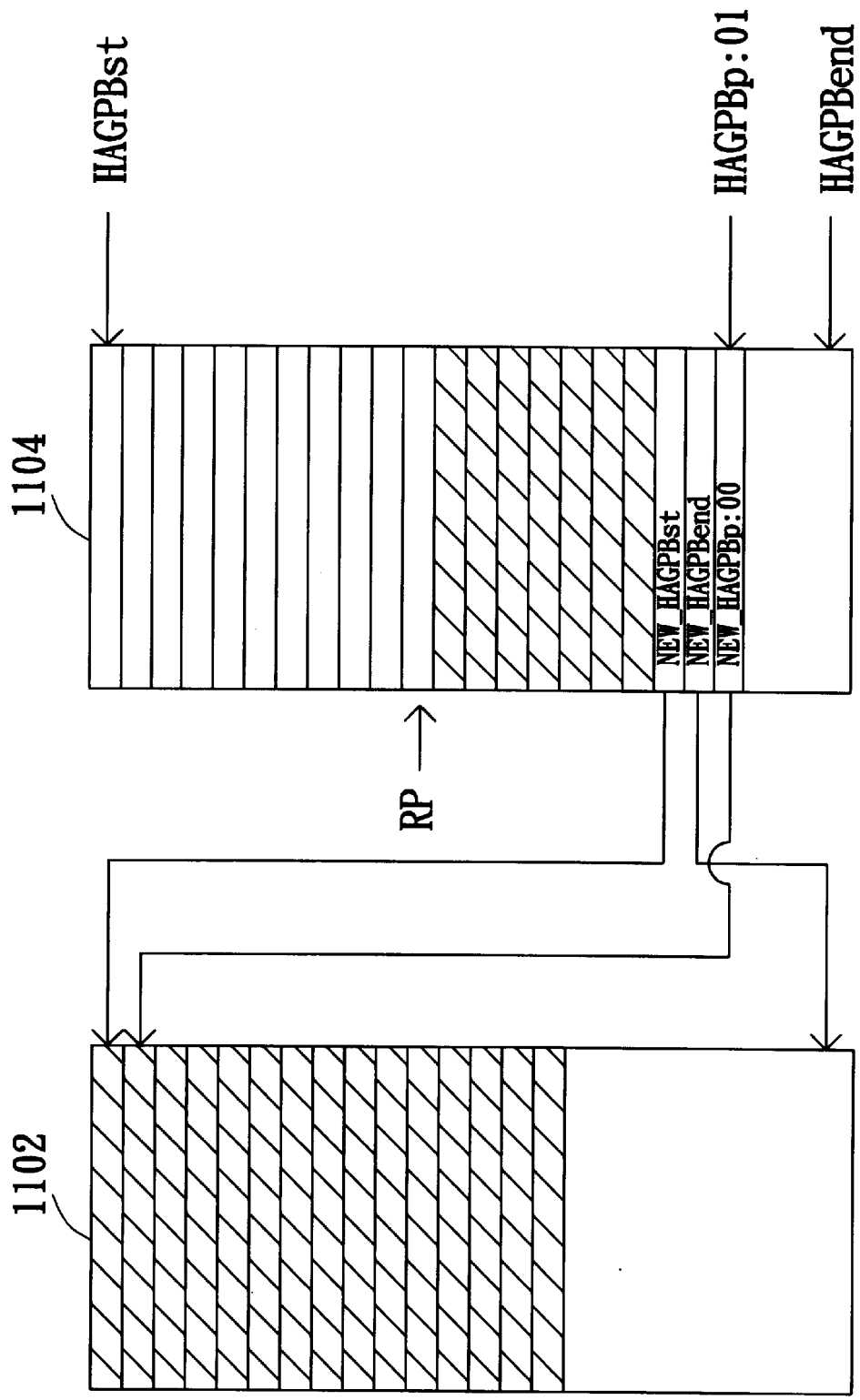

FIG. 13F illustrates the relation between the registers and the first and second buffers 1102 and 1104 after steps 1228 to 1234 are completed. The device driver 312 writes a portion of the AGP command data into the first buffer 1102. As shown in FIG. 13F, since the read pointer RP is in the second buffer 1104 during that time, the device driver 312 is allowed to continue writing AGP command data into the first buffer 1102.

Figure 13G:
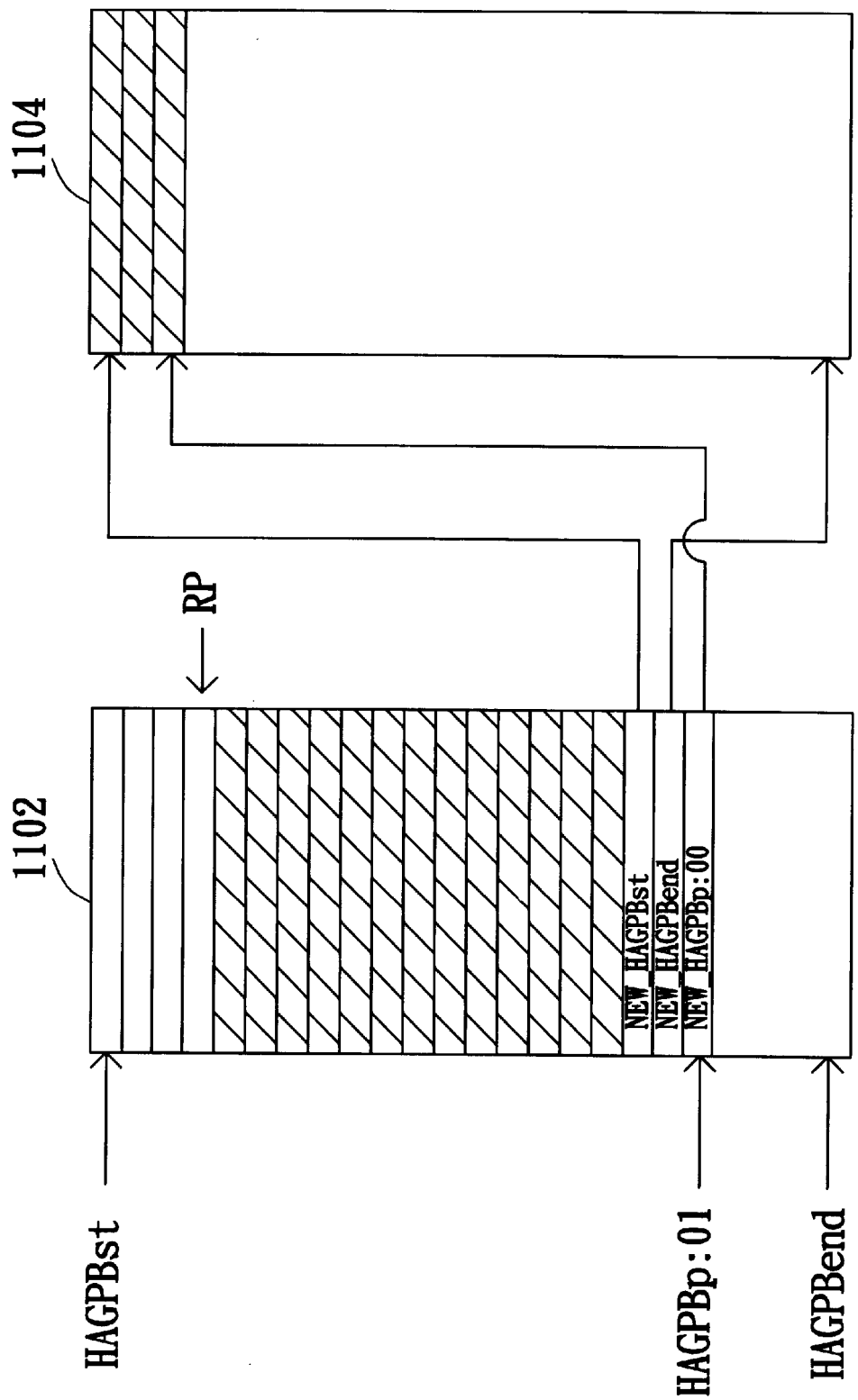

FIG. 13G illustrates the relation between the registers and the first and second buffers 1102 and 1104 after step 1234, or 1210, or 1216 is completed. Since the multimedia chip 110 has started reading the AGP command data in the first buffer, the device driver 312 immediately writes the AGP command data into the second buffer 1104.

It should be noted that the pause register HAGPBp previously points to the address of the last AGP command data that the device driver 312 writes into a buffer. When New_HAGPBp is written into the buffer, the pause register HAGPBp is set to the address at which New_HAGPBp is stored. For the purpose of multiple buffering, the pause code is changed from 00 to 01. That is, after the multimedia chip 110 reads New__HAGPBst, since the address pointed to by the beginning register HAGPBst has changed, the next address to be read is the beginning address of another buffer.

During the method for buffer management, the writing and reading of a buffer pauses within the buffer, which is done by using the pause register HAGPBp with its pause code equal to 00. For the switching from a buffer to another buffer, the pause register HAGPBp with its pause code equal to 01 is employed. For setting the pause code to 01, the beginning and ending addresses of the new buffer must be stored in the beginning register HAGPBst and the ending register HAGPBend before using the pause register HAGPBp with its pause code equal to 01. In addition, the pause address with pause code being 00 of the other buffer may not be stored in the buffer unless the other buffer has already filled with AGP command data.

Further, the number of buffers employed in the method for buffer management in FIG. 12 is not limited to two. No matter how many buffers are used, the device driver 312 requires reading the read pointer RP so as to know which buffer is being read. In addition, the device driver 312 reads the read pointer RP at long intervals.

Figure 14:
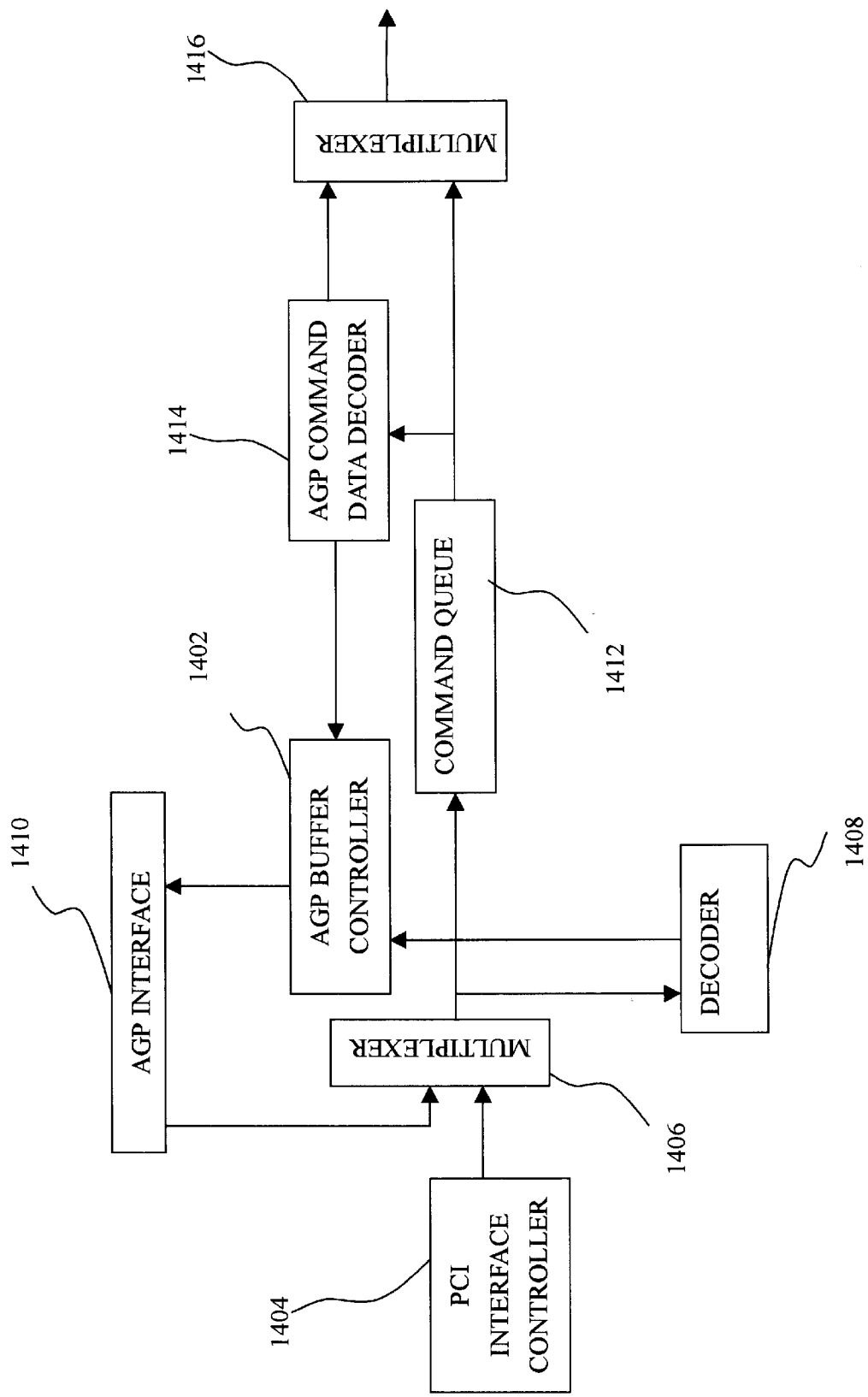
FIG. 14 is a block diagram showing a hardware structure for modifying registers for AGP buffer.

Referring to FIG. 14, it illustrates a hardware structure for changing the content of the register of the AGP buffer. As mentioned above, there are two approaches to the changing of the content of the register. (1) The device driver 312 changes the content of the register through the CPU 102. (2) The multimedia chip 110 reads the address of the buffer, wherein the address is stored in the form of AGP command data. FIG. 14 illustrates the hardware structure for the implementations of the two approaches.

The beginning register HAGPBst, the ending register HAGPBend, and the pause register HAGPBp are all in AGP buffer controller 1402. For the first approach, the device driver 312 changes the content of a register in the AGP buffer controller 1402 by using the CPU 102 to assert a control signal. PCI interface controller 1404 controls the control signal of the CPU 102, and the control signal is transmitted through a PCI bus to multiplexer 1406 and decoder 1408. Once receiving the control signal, the AGP buffer controller 1402 changes the content of the register.

For the second approach, the multimedia chip 110 reads an AGP command data signal from the AGP buffer 112 in the memory 106. The AGP command data signal is then controlled by the AGP interface controller 1410, and sent to AGP command data decoder 1414 through AGP bus, multiplexer 1406, and the command queue 1412, sequentially. By using the AGP command data decoder 1414, the address that is stored in the form of AGP command data is decoded, resulting in an address value. The address value is then sent to the AGP buffer controller 1402 for the change of the content of a register. In addition, if a signal sent by the multiplexer 1406 is not for the change of the content of a register, the signal is sent to the next circuit stage through the multiplexer 1416, for further processing.

As disclosed above, the method for buffer management makes the multimedia chip perform read operations for the AGP buffer in advance and without waiting for all AGP buffers are filled. In this way, memory space of the AGP buffer is used more efficiently and the time for waiting the multimedia chip is reduced.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system for buffer management, comprising:

a central processing unit (CPU), which accesses a memory through a chipset;

a multimedia chip coupled to the chipset via a bus;

a buffer for storing a plurality of command data associated with a plurality of multimedia commands that the CPU is to send to the multimedia chip, wherein the multimedia chip reads the command data from the buffer and executes the command data;

a beginning register for storing a beginning address of the buffer;

an ending register for storing an ending address of the buffer or a buffer length; and a pause storage unit, content of which includes a data address associated with the command data, wherein the pause storage unit has a pause state indicating a next operation to be executed when the multimedia chip has read the command data stored in the buffer with the data address stored in the pause storage unit:

wherein when there are command data left to be written into the buffer:

the pause storage unit stores a data address which is associated with a portion of the command data in the buffer when a portion of the command data is written into the buffer, and the multimedia chip is triggered to begin command data reading from the buffer.

2. A system according to claim 1, wherein the buffer is in the memory.

3. A system according to claim 1, wherein the buffer is in the chipset.

4. A system according to claim 1, wherein the pause storage unit comprises a first pause state, when the pause storage unit is in the first pause state, the multimedia chip reads first command data associated with the content of the pause storage unit, and stops read operation, and the multimedia chip, in the next read operation, is to read command data next to the first command data.

5. A system according to claim 1, wherein the pause storage unit comprises a second pause state, and when the pause storage unit is in the second pause state, the multimedia chip reads second command data associated with the content of the pause storage unit and then reads third command data.

6. A system according to claim 5, wherein the third command data are indicated by a register.

7. A system according to claim 5, wherein the third command data are associated with an address pointed to by the beginning register.

8. A system according to claim 1, wherein the pause storage unit comprises a third pause state, and when the pause storage unit is in the third pause state, the multimedia chip reads fourth command data associated with the content of the pause storage unit and then finishes read operation.

9. A system according to claim 1, wherein the pause storage unit comprises a pause code for indicating a pause state of the pause storage unit.

10. A system according to claim 1, wherein the pause storage unit comprises a first pause register, when the multimedia chip reads first command data associated with content of the first pause register, read operation is stopped, and command data next to the first command data are to be read in the next read operation.

11. A system according to claim 1, wherein the pause storage unit comprises a second pause register, and after the multimedia chip reads second command data associated with content of the second pause register, the multimedia chip reads third command data which are indicated.

12. A system according to claim 11, wherein the third command data are indicated by a register.

13. A system according to claim 11, wherein the third command data are associated with an address pointed to by the beginning register.

14. A system according to claim 1, wherein the pause storage unit comprises a third pause register, and after the multimedia chip reads fourth command data associated with content of the third pause register, the multimedia chip finishes read operation.

15. A system according to claim 1, wherein the data address is the last address of the command data stored in the buffer.

16. A system according to claim 1, wherein the data address is one before the last address of the command data stored in the buffer.

17. A system according to claim 1, wherein the data address is one next to the last address of the command data stored in the buffer.

18. A method for buffer management, for managing write operation for a first device to write pieces of data into a buffer, and read operation for a second device to read the pieces of the data from the buffer, the buffer having a beginning address, an ending address, and a buffer length indicative of a size of the buffer, the method comprising a write process and a read process, and the method using a beginning register, an ending register, a pause storage unit, and a read pointer, wherein the read pointer is to point to an address of data being read from the buffer during the read operation, the write process comprising:
 (a) writing a first piece of the data into the buffer, wherein the first piece of the data written into the buffer is associated with a first data address in the buffer;
 (b) writing the first data address into the pause storage unit;
 (c) triggering the second device; and
 (d) repeating said steps (a) to (d) when there are data left to be written into the buffer;
 wherein before said step (c) the write process further comprises the step of:
 (e) writing the beginning address into the beginning register, and writing the ending address or the buffer length into the ending register;
 and
 the read process comprising:
  (a1) setting the read pointer pointing to the first data address in the buffer;
  (b1) reading data of an address pointed to by the read pointer when the second device is triggered; and
  (c1) continuously reading data next to the data of the address pointed to by the read pointer when the address pointed to by the read pointer is different from content of the pause storage unit, and reading content of the beginning register when the address pointed to by the read pointer is identical to content of the ending register until all of the data are read.

19. A method according to claim 18, wherein said step (c1) further comprises stopping the read operation when the address pointed to by the read pointer is identical to the content of the pause storage unit.

20. A method according to claim 18, wherein the second device is a multimedia chip.

21. A method according to claim 18, wherein the first data address in said step (a) is a last address of the first piece of the data in the buffer.

22. A method according to claim 18, wherein the first data address in said step (a) is one before a last address of the first piece of the data in the buffer.

23. A method according to claim 18, wherein the first data address in said step (a) is one next to a last address of the first piece of the data in the buffer.

24. A method for buffer management, for managing write operation for a device driver to write pieces of data into a first buffer and a second buffer, and read operation for a multimedia chip to read the pieces of the data from the first buffer and the second buffer, the first buffer having a first beginning address, a first ending address, and a first buffer length indicative of a size of the first buffer, the second buffer having a second beginning address, a second ending address, and a second buffer length indicative of a size of the second buffer, the method comprising a write process and a read process, and the method using a beginning register, an ending register, a pause storage unit, and a read pointer, wherein the pause storage unit has at least a first pause state and a second pause state, and the read pointer is to point to an address of data being read from the buffer during the read operation,
 the write process comprising:
 (a) writing a first piece of the data into the first buffer, wherein the first piece of the data written into the first buffer is associated with a first data address in the first buffer;
 (b) writing the first data address into the pause storage unit and setting the pause storage unit in the first pause state;
 (c) triggering the multimedia chip; and
 (d) writing a second piece of the data into the second buffer, and storing the second beginning address and either the second ending address or the second buffer length in the first buffer;
 (e) writing an address of a last data in the first buffer into the pause storage unit, and setting the pause storage unit in the second pause state;
 (f) writing a third piece of the data into the second buffer;
 (g) reading content of the read pointer;
 (h) repeating said step (d) when the content of the read pointer is an address in the first buffer;
 (i) writing a fourth piece of the data into the first buffer, and storing the first beginning address and either the first ending address or the first buffer length in the second buffer;
 (j) writing an address of a last data in the second buffer into the pause storage unit, and setting the pause storage unit in the second pause state;
 (k) writing a fifth piece of the data into the first buffer;
 (l) reading the content of the read pointer; and
 (m) when the content of the read pointer is an address in the second buffer, repeating said step (i); otherwise, repeating said step (d);
 wherein before said step (c) the write process further comprises the step of:
 (n) writing the first beginning address into the beginning register, and writing the first ending address or the first buffer length into the ending register;

and the read process comprising:
- (a1) setting the read pointer pointing to the first data address in the first buffer;
- (b1) reading data of an address pointed to by the read pointer when the multimedia chip is triggered; and
- (c1) when the second beginning address is read from the first buffer, setting the beginning register to the second beginning address; and when one of the second ending address and the second buffer length is read from the first buffer, setting the ending register to the one which is read from the first buffer;
- (d1) when the first beginning address is read from the second buffer, setting the beginning register to the first beginning address; and when one of the first ending address and the first buffer length is read from the second buffer, setting the ending register to the one which is read from the second buffer;
- (e1) when the content of the read pointer is identical to the content of the pause storage unit and the pause storage unit is in the first pause state, stopping the read operation and setting next read operation starting from data next to the data of an address pointed to by the read pointer; and
- (f1) when the content of the read pointer is identical to the content of the pause storage unit and the pause storage unit is in the second pause state, stopping the read operation and setting next read operation starting from an address stored in the beginning register.

25. A method according to claim 24, wherein the pause storage unit further comprising a third pause state, and when the multimedia chip reads fourth command data associated with the content of the pause storage unit and the pause storage unit is in the third pause state, the read operation is finished.

26. A method according to claim 24, wherein the first data address in said step (a) is a last address of the first piece of the data in the first buffer.

27. A method according to claim 24, wherein the first data address in said step (a) is one before a last address of the first piece of the data in the first buffer.

28. A method according to claim 24, wherein the first data address in said step (a) is one next to a last address of the first piece of the data in the first buffer.

* * * * *